(12) United States Patent
Sawaguchi

(10) Patent No.: US 7,452,939 B2
(45) Date of Patent: Nov. 18, 2008

(54) POLYESTERIFIED BLOCK COPOLYMER AND PROCESS FOR PRODUCING THE SAME

(75) Inventor: Takashi Sawaguchi, Kanagawa (JP)

(73) Assignees: San-Ei Kougyou Corporation, Misato-shi (JP); Takashi Sawaguchi, Yokohama-shi (JP)

( * ) Notice: Subject to any disclaimer, the term of this patent is extended or adjusted under 35 U.S.C. 154(b) by 662 days.

(21) Appl. No.: 10/509,124

(22) PCT Filed: Mar. 26, 2003

(86) PCT No.: PCT/JP03/03736

§ 371 (c)(1),
(2), (4) Date: Jul. 25, 2005

(87) PCT Pub. No.: WO03/082957

PCT Pub. Date: Oct. 9, 2003

(65) Prior Publication Data

US 2006/0025532 A1 Feb. 2, 2006

(30) Foreign Application Priority Data

Mar. 29, 2002 (JP) ............... 2002-093813
Apr. 18, 2002 (JP) ............... 2002-116131

(51) Int. Cl.
*C08G 81/00* (2006.01)
*C08L 23/10* (2006.01)
*C08F 8/14* (2006.01)

(52) U.S. Cl. .............. 525/84; 525/64; 525/67; 525/68; 525/69; 525/240; 525/241; 525/242; 525/316; 525/327.7

(58) Field of Classification Search ........... 525/64, 525/67, 69, 84, 240, 241, 242, 316, 327.1, 525/191
See application file for complete search history.

(56) References Cited

U.S. PATENT DOCUMENTS

| | | | |
|---|---|---|---|
| 3,956,426 A | 5/1976 | Schepers | |
| 4,293,660 A | 10/1981 | Sugio et al. | |
| 4,526,927 A | 7/1985 | Hambrecht et al. | |
| 4,910,321 A | 3/1990 | Kennedy et al. | |
| 5,321,064 A | 6/1994 | Vaidya et al. | |
| 5,674,930 A | 10/1997 | Sugiura et al. | |
| 6,852,799 B2 * | 2/2005 | Baidak et al. | 525/74 |

FOREIGN PATENT DOCUMENTS

| | | | |
|---|---|---|---|
| EP | 0 308 743 A1 | 9/1988 | |
| EP | 0 469 799 A2 | 7/1991 | |
| EP | 0485982 A2 | 11/1991 | |
| EP | 0485982 A3 | 11/1991 | |
| EP | 0507561 A1 | 10/1992 | |
| JP | 2001-278928 | 1/2000 | |
| WO | WO 87/05311 | 9/1987 | |
| WO | WO 02/20644 A2 | 3/2002 | |
| WO | WO 02/42340 A1 | 5/2002 | |

OTHER PUBLICATIONS

English Language Patent Abstract of Japanese Publication No. 2001-278928, Japanese Patent Office; 1 page, Publication Date Oct. 10, 2001.
English Language Patent Abstract of PCT Publication No. WO 02/42340 A1, Japanese Patent Office; 1 page, Publication Date May 30, 2002.
English Language Communication from the European Patent Office, dated Jun. 16, 2005, 4 pages.
English translation of Preliminary Examination Report for PCT/JP2003/003736 dated Mar. 23, 2003; 6 pages.
English translation of patent abstract for European Patent No. EP0308743, entitled "Thermoplastic moulding Compositions Based on Styrenic Polymers and Polyphenylene Ethers." Translation provided by esp@cnet database.

* cited by examiner

*Primary Examiner*—Randy Gulakowski
*Assistant Examiner*—Olga Asinovsky
(74) *Attorney, Agent, or Firm*—Sterne, Kessler, Goldstein & Fox P.L.L.C.

(57) ABSTRACT

A polyesterified block copolymer represented by the general formula (1), (2) or (3) (for example, polyolefin/polyolefin block copolymer of the following general formula (1)), obtained by an esterification reaction between a terminal maleated polymer and a terminal hydroxylated polymer. Also, a process for producing the same is provided. (1) wherein each of $R^1$ and $R^2$ represents hydrogen or methyl; m is an integer of 10 to 200; n is an integer 10 to 200; k is an integer 5 of to 3000.

5 Claims, 19 Drawing Sheets

US 7,452,939 B2

POLYESTERIFIED BLOCK COPOLYMER AND PROCESS FOR PRODUCING THE SAME

TECHNICAL FIELD

The present invention relates to a nolve polyesterified block copolymer and to a process for producing the same. More particularly, it relates to a novel polyesterified block copolymer obtainable by an esterification reaction between a terminally maleic acid-modified polymer and a terminally hydroxylated polymer and to a process for producing the same.

BACKGROUND ART

Synthesis of functional macromolecules resulting from impartation of various new or improved functionalities to macromolecular compounds is an important problem for macromolecular chemistry. However, there are difficulties in introduction of a functional group which contributes to the aforementioned functionalities to a specific position in a polymer chain utilizing a macromolecular reaction and therefore widely usable methods for synthesizing such functional macromolecules have been awaited. What the present invention intends is to establish such widely usable methods and to create a group of novel functional macromolecular compounds by applying the methods to processes for producing specific functional macromolecules.

For example, polypropylene, which is one of the major three polymers, is excellent macromolecular material having advantages such as being inexpensive, being superior in oil resistance and chemical resistance, and having less environmental load. However, polypropylene is a non-polar macromolecule and it is difficult to introduce a functional group to it. Therefore, it has problems in that it is difficult to reinforce it through its blending with other macromolecules having polar groups because of its less interaction with other polar substances or that it is poor in paintability and adhesiveness.

In recent years researches on new functionalized polypropylene for solving such problems have been done actively. One of such researches involves introduction of functional groups and conversion to diblock copolymers of a polypropylene having vinylidene at one terminal synthesized by a polymerization reaction using a metallocene type catalyst. This is based on the fact that elimination of hydrogen of the β-position occurs selectively at a growing terminal and a vinylidene-type double bond is formed at one terminal if polymerization conditions are properly selected. The mono-terminal double bond is very useful for functionalization of polypropylene because it can be converted easily into various functional groups. However, in this case, there are limitations on improvement of physical properties because there is a functional group in a molecular chain only at one terminal. Therefore, no satisfactory new functionalized polypropylene has been obtained yet.

As another example, synthesis of syndiotactic polypropylene has been done recently using polymerization of styrene by use of metallocene type catalysts. Syndiotactic polystyrene has characteristics such as higher melting point, higher crystallinity and better chemical resistance in comparison to widely used polystyrene because of its high stereospecificity. Therefore, development of applications for making use of these characteristics is proceeding actively. However, syndiotactic polystyrene has the defect of being fragile. Although various attempts have been made for overcoming this defect, satisfactory substances have not been obtained yet.

As mentioned above, providing functional macromolecular compounds such as new functionalized polypropylene or polystyrene of improved function by widely usable synthesis methods will lead to development and production of more types of functional macromolecular compounds.

DISCLOSURE OF THE INVENTION

It is an object of the present invention to provide a novel polyolefin/polyolefin block copolymer having a new function and a process for the production thereof based on one macromolecular synthesis strategy.

It is another object of the present invention to provide a novel polystyrene/polyethylene block copolymer having a new function and a process for the production thereof based on one macromolecular synthesis strategy.

The present inventors tried to attain the aforementioned objects by utilizing a process comprising 1) converting a polymer containing a terminal vinylidene group (or terminal vinyl group) into a terminally maleic anhydride-modified polymer, 2) converting a polymer of a type the same as or different from the polymer containing a terminal vinylidene group (or a terminal vinyl group) into a terminally hydroxylated polymer, and 3) synthesizing a polyesterified block copolymer through an esterification reaction between both the converted polymers.

The present inventors studied diligently a sequential esterification reaction between a polyolefin resulting from maleic acid modification (maleic anhydride modification) of the vinylidene groups of a telechelic polypropylene and a telechelic poly-1-butene located at their both terminals, the telechelic polypropylene and the telechelic poly-1-butene being obtained by thermal decomposition of a polypropylene and a poly-1-butene, and a polyolefin resulting from hydroxylation of the vinylidene groups at both the terminals. As a result, they reached a novel polyolefin/polyolefin copolymer to attain one object of the present invention.

According to a first aspect of the present invention provided is a polyolefin/polyolefin block copolymer represented by the following general formula (1):

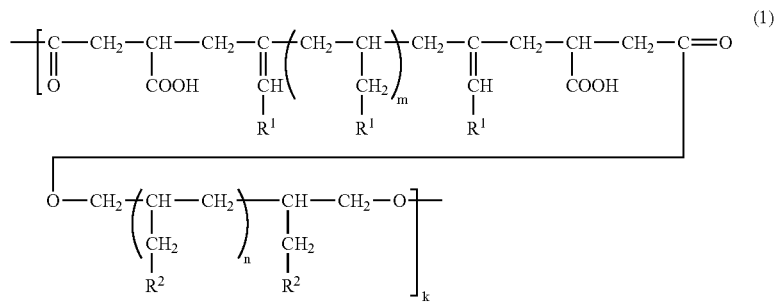

(1)

wherein $R^1$ and $R^2$ each independently represent a hydrogen atom or a methyl group, m represents an integer of from 10 to 200, n represents an integer of from 10 to 200, and k represents an integer of from 5 to 3000.

In addition, according to the present invention provided is a process for producing a polyolefin/polyolefin block copolymer, the process comprising hydroxylating a polyolefin selected from the group consisting of atactic telechelic polypropylene, isotactic telechelic polypropylene, syndiotactic telechelic polypropylene and isotactic telechelic poly-1-butene at its both terminals, separately modifying a polyolefin the same as or different from the polyolefin selected above at its both terminals with maleic anhydride, and obtaining a block copolymer through an esterification reaction between the hydroxylated polyolefin and the maleic anhydride-modified polyolefin.

Then, the present inventors studied diligently a sequential esterification reaction between a polystyrene resulting from maleic acid modification (maleic anhydride modification) of the vinylidene group which a polystyrene has at a terminal thereof and a polyethylene resulting from hydroxylation of a polyethylene having a vinyl group at a terminal thereof. As a result, they reached a novel polystyrene/polyethylene block copolymer to complete the present invention.

According to a second aspect of the present invention, a polystyrene/polyethylene block copolymer represented by the following general formula (2) or general formula (3):

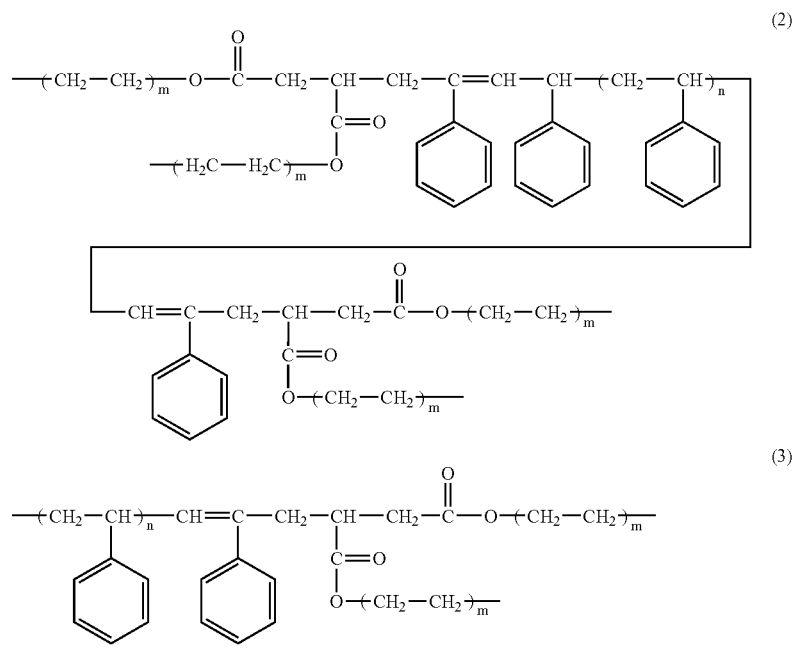

wherein m represents an integer of from 500 to 50000 and n represents an integer of from 50 to 5000.

In addition, according to the present invention provided is a process for producing a polystyrene/polyethylene block copolymer, the process being characterized by obtaining a block copolymer through an esterification reaction between a maleic anhydride-modified polystyrene and a hydroxylated polyethylene.

BEST MODE FOR CARRYING OUT THE INVENTION

Figure 1:
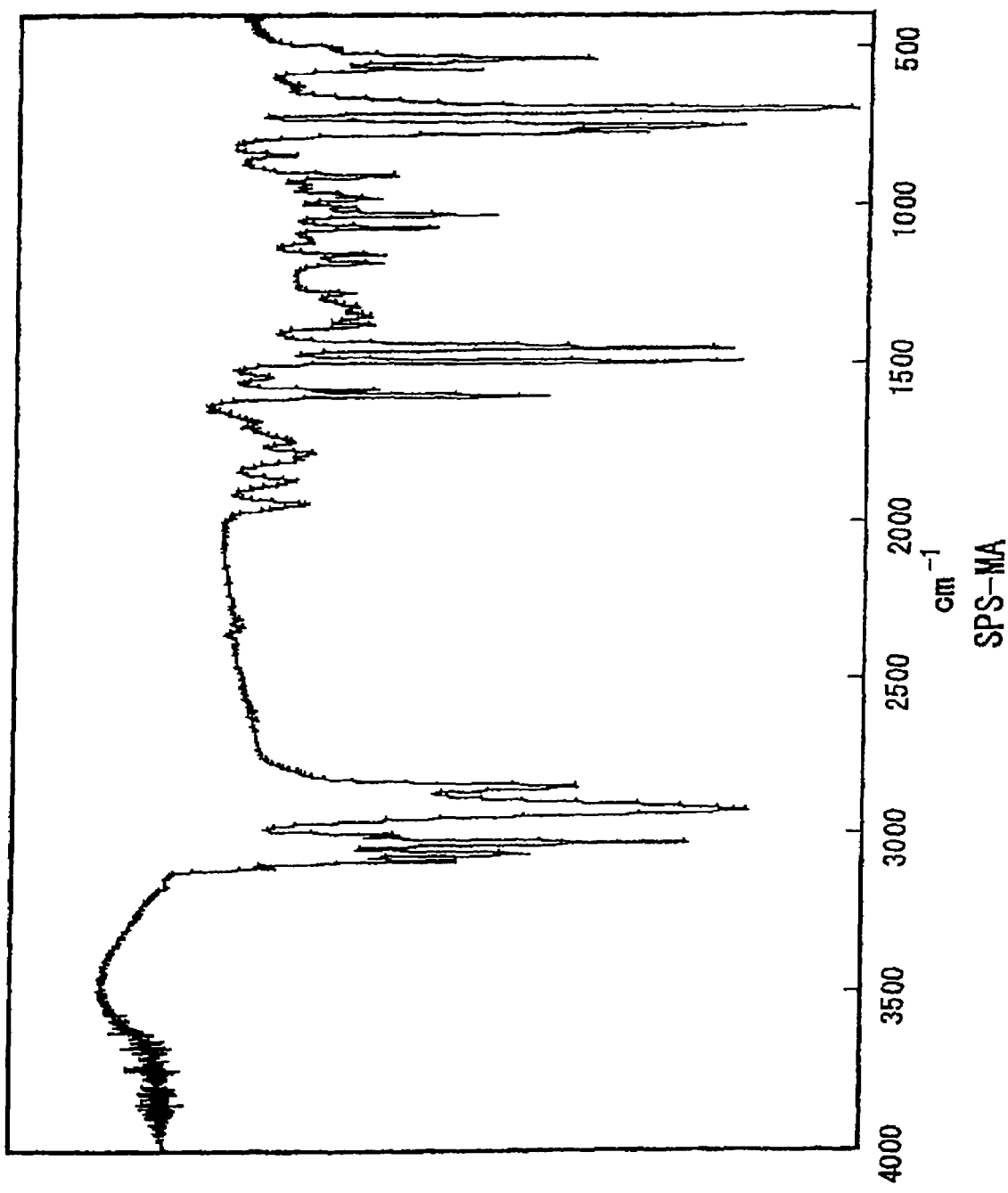
FIG. 1 is a diagram which shows the IR data of SPS-MA.

The constitution and the preferred embodiments of the present invention will be described in detail below.

First Aspect of the Present Invention

In the present invention, a diterminally vinylidene group-containing telechelic polyolefin, which is a thermal decomposition product resulting from thermal decomposition of a polyolefin (e.g. polypropylene or poly-1-butene) is used as a starting material.

The polypropylene suffers from random breakage in its main chain caused by thermal decomposition, and thus the molecular weight thereof is reduced. As is disclosed in Macromolecules, 28, 7973 (1995), it is possible to synthesize selectively telechelic polypropylene having vinylidene groups at its both terminals by highly controlling the thermal decomposition of propylene. Such telechelic polypropylene has characteristics of a number average molecular weight Mn of about 1,000 to 10,000, a polydispersity Mw/Mn of up to 2, an average number of vinylidene groups per molecule of about 1.8 and retaining the stereospecificity of the starting polypropylene before thermal decomposition. The weight average molecular weight of the starting polypropylene before thermal decomposition is preferably within the range of from 10,000 to 1,000,000, more preferably within the range of from 200,000 to 800,000.

In the thermal decomposition, the device disclosed in Journal of Polymer Science: Polymer Chemistry Edition, 21, 703 (1983) may be used as a thermal decomposition device. Polypropylene is introduced into a reactor in a thermal decomposition device made of Pyrex® glass. The polypropylene is subjected to a thermal decomposition reaction at a predetermined temperature for a predetermined time under inhibition of secondary reactions by removal of volatile products achieved by vigorous bubbling the molten polymer phase with nitrogen gas. After the thermal decomposition reaction, the residue in the flask is dissolved in hot xylene and filtered while being hot. Then, it is allowed to reprecipitate in alcohol, thereby being purified. The reprecipitation is collected by filtration and then vacuum dried to yield telechelic polypropylene.

Thermal decomposition conditions are adjusted by predicting the molecular weight of the telechelic polypropylene based on the molecular weight of the polypropylene before the thermal decomposition and the primary structure of the block copolymer which is the finally desired product and taking the results of experiments conducted in advance into consideration. The thermal decomposition temperature preferably ranges from 300° C. to 450° C. At a temperature lower than 300° C. the thermal decomposition reaction may not proceed sufficiently, whereas at a temperature higher than 450° C. degradation of telechelic polypropylene may proceed.

Similarly, when poly-1-butene is subjected to highly controlled thermal decomposition, a telechelic poly-1-butene having vinylidene groups at its both terminals is formed.

A hydroxylated polyolefin is prepared by hydroxylating a polyolefin at both terminals thereof which was obtained by the aforementioned method and which is selected from the group consisting of atactic telechelic polypropylene, isotactic telechelic polypropylene, syndiotactic telechelic polypropylene and isotactic telechelic poly-1-butene.

The hydroxylation reaction is achieved by hydroxylating the vinylidene double bonds at both terminals of the telechelic polyolefin through hydroboration followed by an oxidation reaction. In one embodiment of the present invention, tetrahydrofuran is used as solvent and hydroboration is carried out first by adding a boration reagent to polyolefin. As the boration reagent, 9-borabicyclononane or a borane-tetrahydrofuran complex can be preferably used. When aqueous hydrogen peroxide is added to the reaction solution after the hydroboration, oxidation is conducted to yield hydroxylated telechelic polyolefin (for example, hydroxylated telechelic polypropylene).

Separately, a maleic acid-modified polyolefin is prepared by modifying a polyolefin the same as (or of the same type as) or different (or of different type) from the selected polyolefin with maleic acid (preferably, with maleic anhydride-modifying) at its both terminals.

The maleic anhydride modification reaction is achieved by maleic anhydride modification using an Alder-ene reaction of the vinylidene groups at both terminals of the telechelic polyolefin resulting from thermal decomposition. In one embodiment of the present invention, a maleic anhydride-modified telechelic polyolefin (e.g. maleic anhydride-modified telechelic polypropylene) is obtained by using decahydronaphthalene as solvent, adding maleic anhydride and an antioxidant such as dibutylhydroxytoluene, and carrying out a reaction while stirring under a nitrogen gas stream.

The polyolefin/polyolefin copolymer of the present invention is obtained by subjecting a hydroxylated telechelic polyolefin and a maleic anhydride-modified telechelic polyolefin both prepared in the manner previously mentioned to an esterification reaction in the presence of a catalyst such as p-toluenesulfonic acid.

The reaction conditions of the esterification reaction are not particularly restricted, but are preferably under reduced pressure in the absence of solvent. For preventing the hydrolysis of the copolymer formed, it is preferable to remove moisture from the system.

Regarding the number of repeating units in the polyolefin/polyolefin copolymer of the present invention, m in the general formula (1) is an integer of from 10 to 200, preferably an integer of from 20 to 150. Further, n is an integer of from 10 to 200, preferably an integer of from 20 to 150. Moreover, k is an integer of from 5 to 3000, preferably an integer of from 10 to 2000.

The polyolefin/polyolefin copolymer of the present invention has a high molecular weight as shown in Examples and therefore has sufficient entanglement of the molecular chain. As a result, the copolymer can be molded into films or the like and it can be expected to be used in various fields.

Second Aspect of the Present Invention

The present invention uses a polystyrene having a vinylidene group at a terminal thereof as a starting material, but the method for the production thereof is not particularly restricted. It is preferable to use a terminal vinylidene group-containing polystyrene obtained by thermal decomposition of polystyrene.

In the thermal decomposition, polystyrene is thermally decomposed under inert atmosphere under a pressure of 20 mmHg or less at a temperature of 270 to 500° C., preferably under a pressure of 10 mmHg or less at a temperature of 300 to 400° C. In this case, a terminal vinylidene group-containing polystyrene is obtained as a non-volatile compound by purifying the residue in a reactor by reprecipitation after the thermal decomposition. Regarding the reactor, the thermal decomposition device for the aforementioned polyolefin can be used. The terminal vinylidene group-containing polystyrene is required only to have a vinylidene group at least at one terminal (namely, a single terminal) and may have it at both terminals.

In the terminal vinylidene group-containing polystyrene used in the present invention, it is preferable that its steric structure be a syndiotactic structure. The syndiotactic structure means a steric structure in which phenyl groups in side chains are located alternately on opposite sides with respect to a main chain composed of carbon-carbon bonds. The tacticity is quantitively determined by the nuclear magnetic resonance method using isotopic elements. The tacticity measured by such a method can be indicated by the proportion of successive constitutional units, for example, diad for two units, triad for three units, and pentad for five units. As the syndiotactic polystyrene in the present invention, recommended is that mainly including syndiotactic polystyrene having a syndiotacticity of a racemic diad of 75% or more, preferably 85% or more or a racemic pentad of 30% or more, preferably 50% or more.

Moreover, the present invention uses a polyethylene having a vinyl group at a terminal thereof as a starting material, but the method for the production thereof is not particularly restricted. It is preferable to use a terminal vinyl group-containing polyethylene obtained by the Phillips method.

The hydroxylation reaction is achieved by hydroxylating the terminal vinyl double bond of a polyethylene through hydroboration followed by an oxidation reaction. In one embodiment of the present invention, tetrahydrofuran is used as solvent and hydroboration is carried out first by adding a boration reagent to polyethylene. As the boration reagent, 9-borabicyclononane can be preferably used. When aqueous hydrogen peroxide is added to the reaction solution after the hydroboration, oxidation is conducted to yield hydroxylated polyethylene.

The maleic anhydride modification reaction is achieved by subjecting the terminal vinylidene group of the polystyrene to maleic anhydride modification as mentioned previously. In one embodiment of the present invention, a maleic anhydride-modified polystyrene is obtained by using decahydronaphthalene as solvent, adding maleic anhydride and an antioxidant such as dibutylhydroxytoluene, and carrying out a reaction while stirring under a nitrogen gas stream.

The polystyrene/polyethylene copolymer of the present invention is obtained by subjecting hydroxylated polystyrene and maleic anhydride-modified polyethylene both prepared in the manner previously mentioned to an esterification reaction by heating in the presence or absence of a solvent. In this case, the reaction temperature is preferably within the range of 60 to 300° C., more preferably within the range of 100 to 280° C. It should be noted that a catalyst such as p-toluenesulfonic acid may, as required, be employed.

Regarding the number of repeating units in the polystyrene/polyethylene block copolymer of the present invention, in the general formulae (2) and (3), m is an integer within the range of from 500 to 5000, preferably within the range of from 1000 to 40000 and n is an integer within the range of from 50 to 5000, preferably within the range of from 100 to 4000.

In the polystyrene/polyethylene block copolymer of the present invention, it is assumed that microphase separation is occurring. According to the measurement of viscoelasticity, the copolymer has a characteristic in that the rubbery state is maintained in high temperature region of 120 to 220° C. and therefore the development thereof to applications in which impact resistance is required can be expected.

EXAMPLES

The present invention will be described below in more detail by reference to Examples. It should be noted that the present invention is not restricted to the Examples. In the Examples, the abbreviations shown below are used:

PP-OH: hydroxylated polypropylene
PP-MA: maleic anhydride-modified polypropylene
aPP: atactic polypropylene
iPP: isotactic polypropylene
sPP: syndiotactic polypropylene
iPB: isotactic polybutylene
PP-b-PP: polypropylene/polypropylene block copolymer
PB-b-PP: poly-1-butene/polypropyplene block copolymer SPS: syndiotactic polystyrene SPS-TVD: vinylidene group-terminated syndiotactic polystyrene SPS-MA: maleic anhydride-modified syndiotactic polystyrene PE: polyethylene PE-TVD: vinyl group-terminated polyethylene PE-OH: hydroxylated polyethylene SPS-b-PE: syndiotactic polystyrene/polyethylene block copolymer In the Examples, the following experimental instruments were employed.

GPC: HLC-8121GPC/HT (manufactured by Tosoh Corp.)

DSC: TG/DTA6200 (manufactured by Seiko Instruments Inc.)

FT-IR: 1600-FT-IR (manufactured by PerkinElmer, Inc.)

Production Example 1

Thermal Decomposition of SPS

SPS pellets having a number average molecular weight of 75,000 (manufactured by Idemitsu Petrochemical Co., Ltd.) were thermally decomposed under conditions including a temperature of 390° C. and a time of 60 minutes. After the reaction, the residue in the reactor was purified by reprecipitation to yield SPS-TVD. The resulting SPS-TVD had a number average molecular weight Mn of 12,000, a polydispesity Mn/Mw of 2.0, an average number of terminal vinylidene groups per molecule, f, of 0.92.

Production Example 2

Maleic Anhydride Modification of SPS-TVD

Into a flask, 1.5 g of SPS-TVD was added and further maleic anhydride and butylhydroxytoluene were added so that the molar ratio became 1:42:1.68. To a reaction device, a thermometer, a reflux condenser equipped with silica gel at the top, and a capillary with a balloon containing nitrogen gas were mounted. Using 30 ml of decahydronaphthalene as solvent, reaction was conducted for 24 hours in an oil bath at 180° C. After the reaction, hot filtration was conducted using 250 ml of acetone as precipitation solvent. The resulting precipitation was collected by suction filtration and dried under reduced pressure to yield SPS-MA. The IR data of SPS-MA are shown in FIG. 1.

Production Example 3

Hydroxylation of PE-TVD

Into a flask, 1 g of PE-TVD (manufactured by Showa Oil, Co., Ltd.) and 40 ml of tetrahydrofuran were added and the flask was connected with a reflux condenser with a nitrogen gas balloon, an injector, a thermometer and a vacuum pump. The flask was dipped in liquid nitrogen and the sample in the flask was thereby frozen together with the solvent. The inside of the flask was degassed by a vacuum pump and nitrogen gas was charged from the balloon. Thereafter, the temperature was returned to room temperature and thus the sample was melted. Nitrogen purge was achieved through repetition of this operation. Then, a borane-tetrahydrofuran complex (manufactured by Kanto Kagaku) as a boration reagent was introduced by an injector and a reaction was carried out for 5 hours with stirring in an oil bath at 70° C. under a nitrogen atmosphere.

Figure 2:
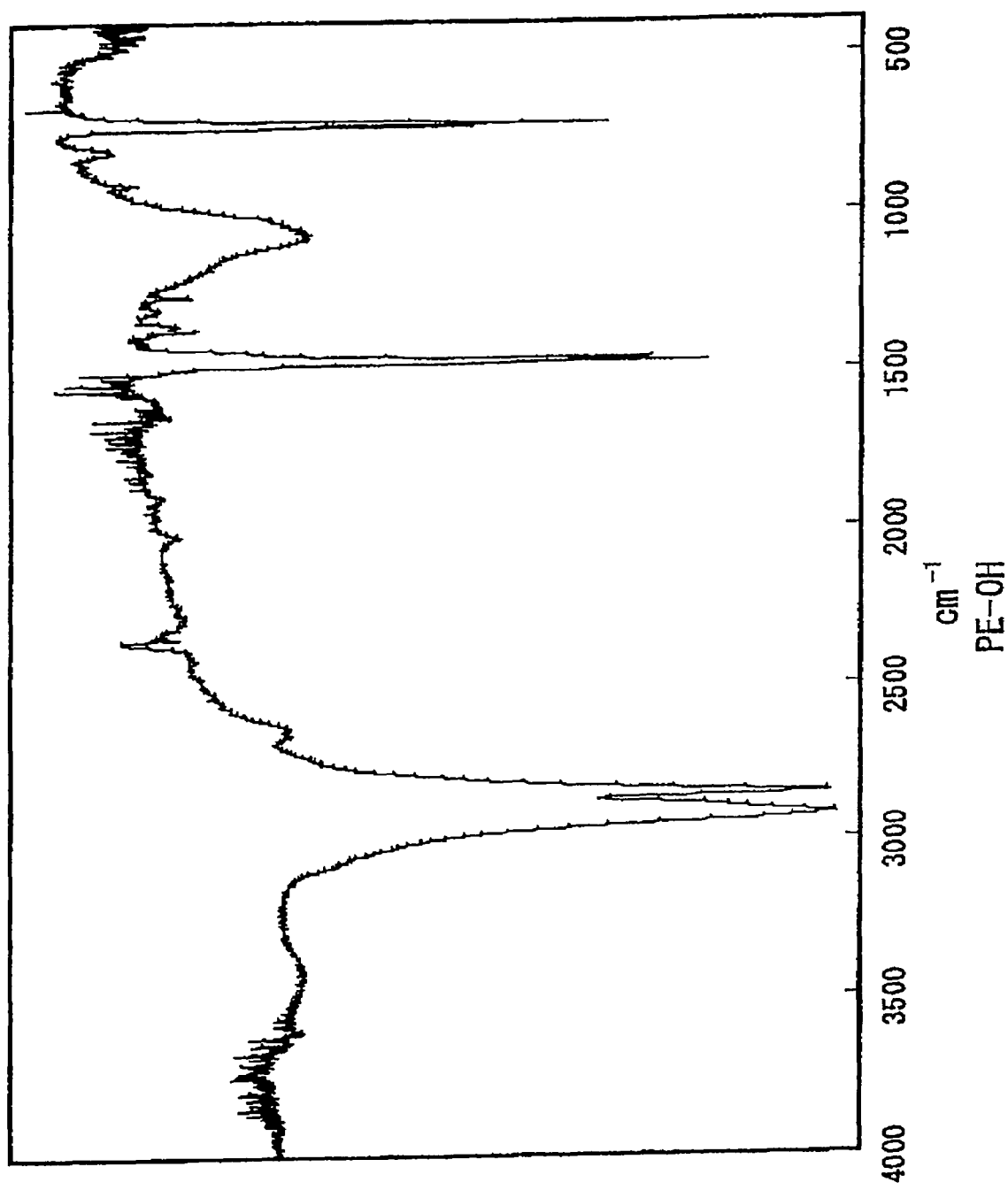
FIG. 2 is a diagram which shows the IR data of PE-OH.
Figure 3:
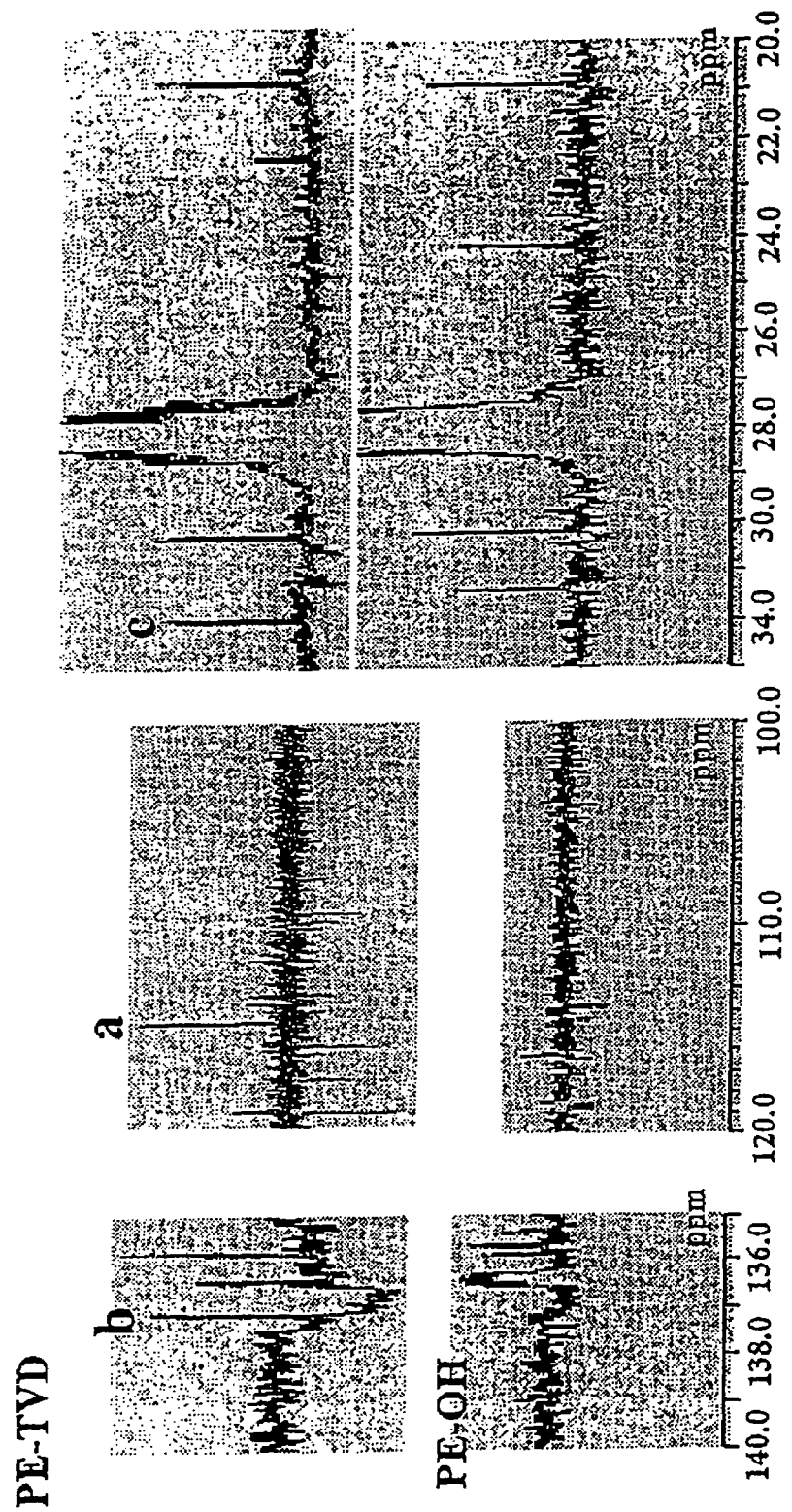
FIG. 3 is a diagram which shows the $^{13}$CNMR data of PE-TVD and PE-OH.

After the reaction, the flask was cooled to about 0° C. in an ice bath and then sodium hydroxide, methanol and 35% aqueous hydrogen peroxide were dropped. Thereafter, a reaction was carried out for 15 hours in an oil bath at 50° C. The solution in the flask was poured into methanol of an amount twice the reaction solution. The precipitation was filtered. Thus, polymer was collected and then refluxed in methanol for two hours. The polymer was collected again by filtration and was dried under reduced pressure at 50° C. to yield PE-OH. The IR data of PE-OH are shown in FIG. 2. The $^{13}$CNMR data of the raw material PE-TVD and the product PE-OH are shown in FIG. 3.

Example 1

Synthesis of Polypropylene/Polypropylene Block Copolymer (aPP-b-sPP)

Figure 4:
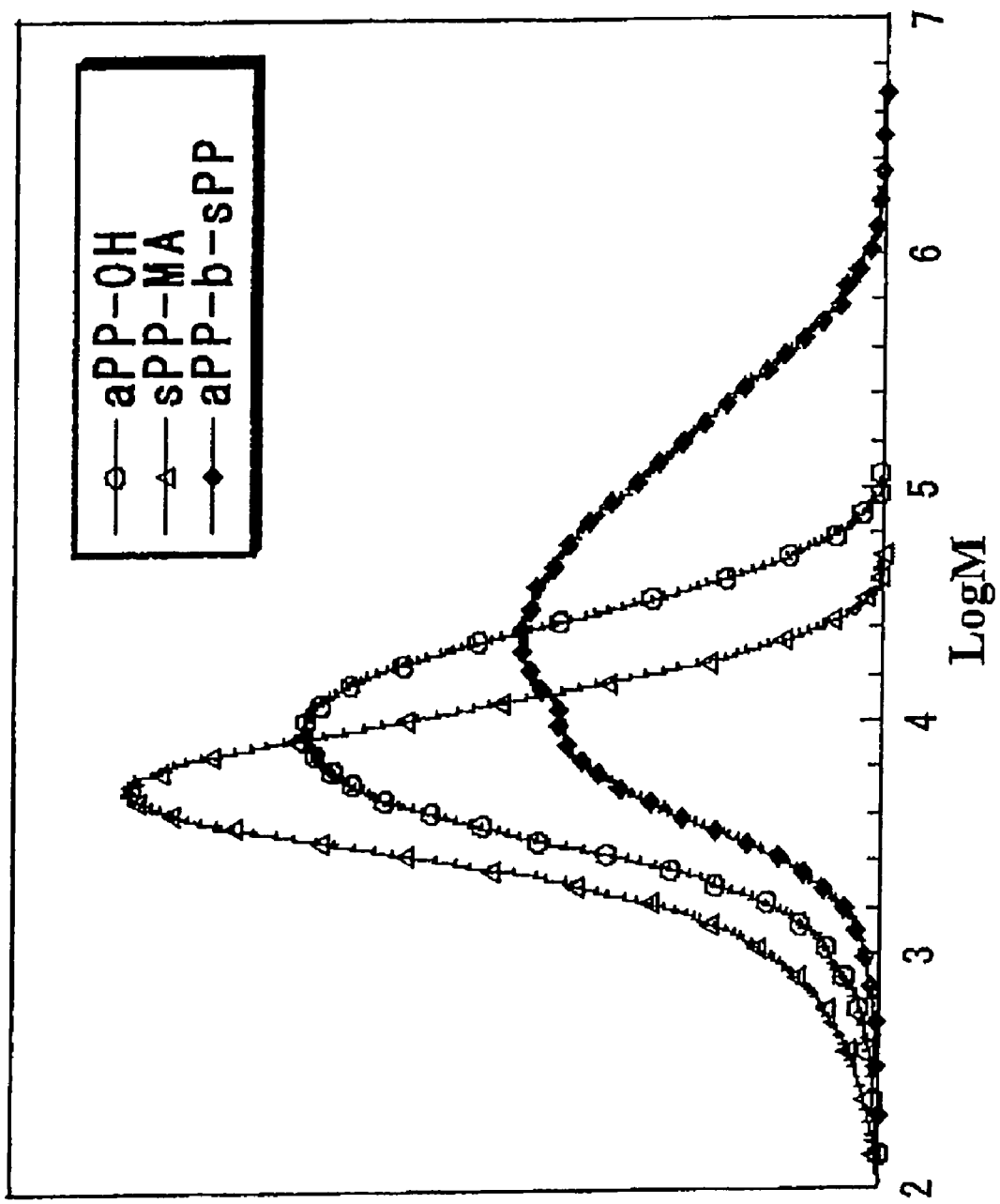
FIG. 4 is a diagram which shows the GPC curves of aPP-OH, sPP-MA and aPP-b-sPP.
Figure 5:
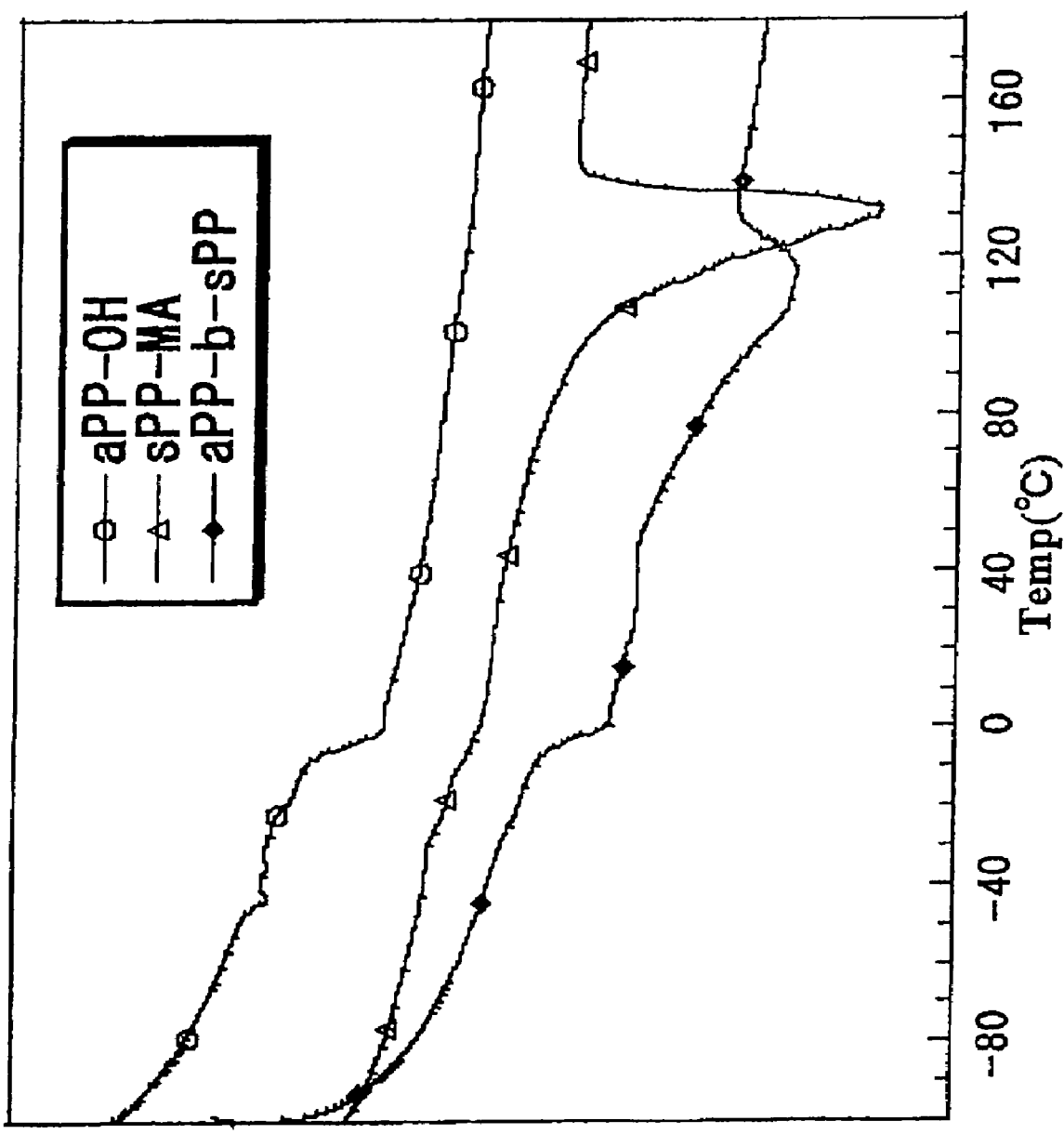
FIG. 5 is a diagram which shows the DSC curves of aPP-OH, SPP-MA and aPP-b-sPP.

Into an eggplant type flask, 0.22 g of aPP-OH, 0.11 g of sPP-MA and 0.0087 g of p-toluenesulfonic acid as catalyst were introduced and a two-way stopcock was mounted. Then, the inside of the flask was evacuated to 1-2 mmHg and a reaction was carried out in a molten state at 190° C. for 24 hours. After the completion of the reaction, the flask was returned to room temperature and 0.31 g of copolymer aPP-b-sPP was recovered. The GPC curves of the raw material and the copolymer are shown in FIG. 4. The DSC curves of the raw material and the copolymer are shown in FIG. 5. The molecular weights, polydispersities, melting points and melting enthalpies of the raw material and the copolymer are shown in Table 1.

TABLE 1

|  | $Mn \times 10^{-3}$ | Mw/Mn | Tm (° C.) | _H (J/g) |
|---|---|---|---|---|
| aPP-OH | 4.95 | 2.53 | — | — |
| sPP-MA | 2.89 | 2.16 | 131.0 | 50.5 |
| aPP-b-sPP | 10.9 | 7.41 | 115.0 | 17.5 |

Example 2

Synthesis of Polypropylene/Polypropylene Block Copolymer (aPP-b-iPP)

Figure 6:
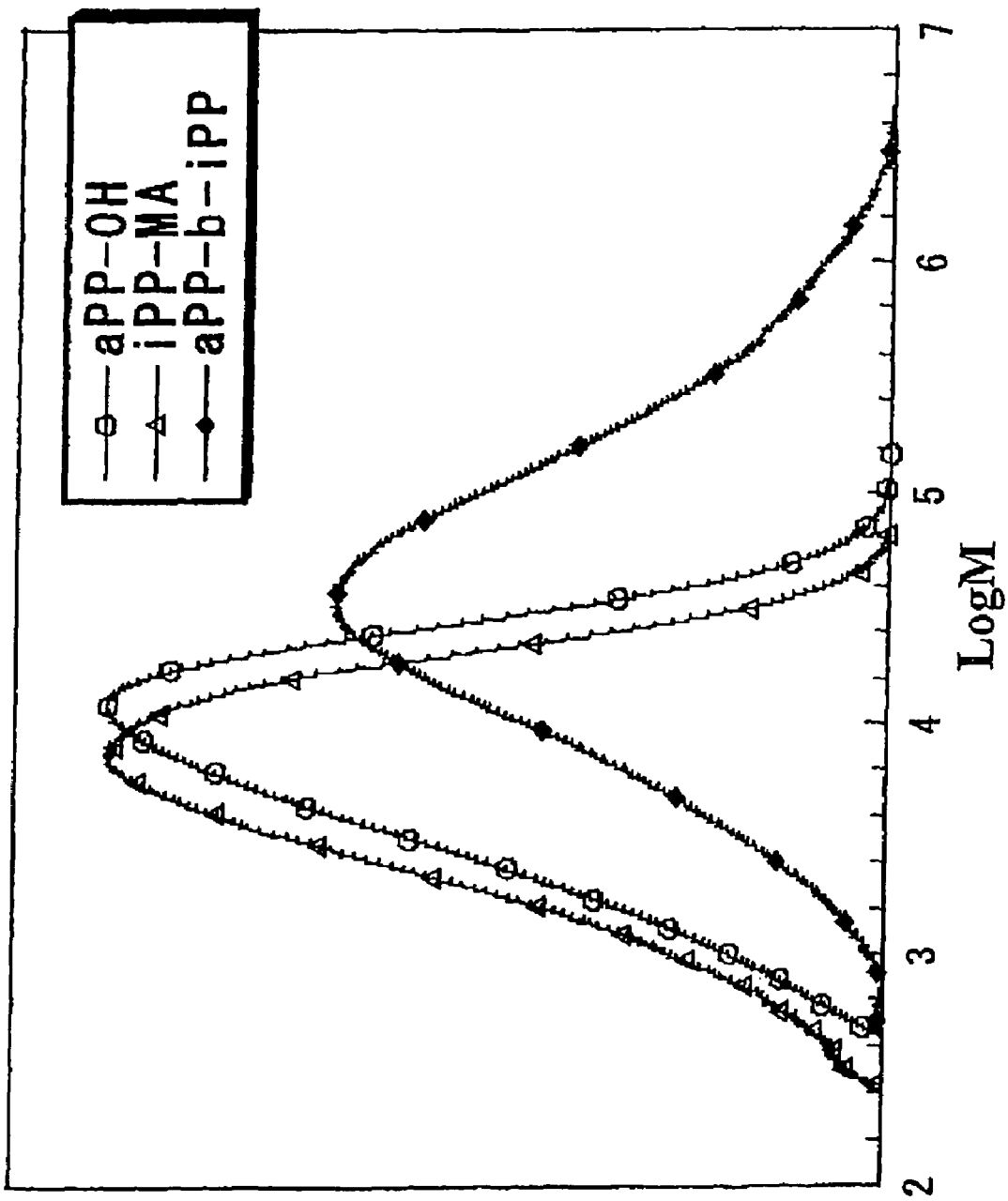
FIG. 6 is a diagram which shows the GPC curves of aPP-OH, iPP-MA and aPP-b-iPP.
Figure 7:
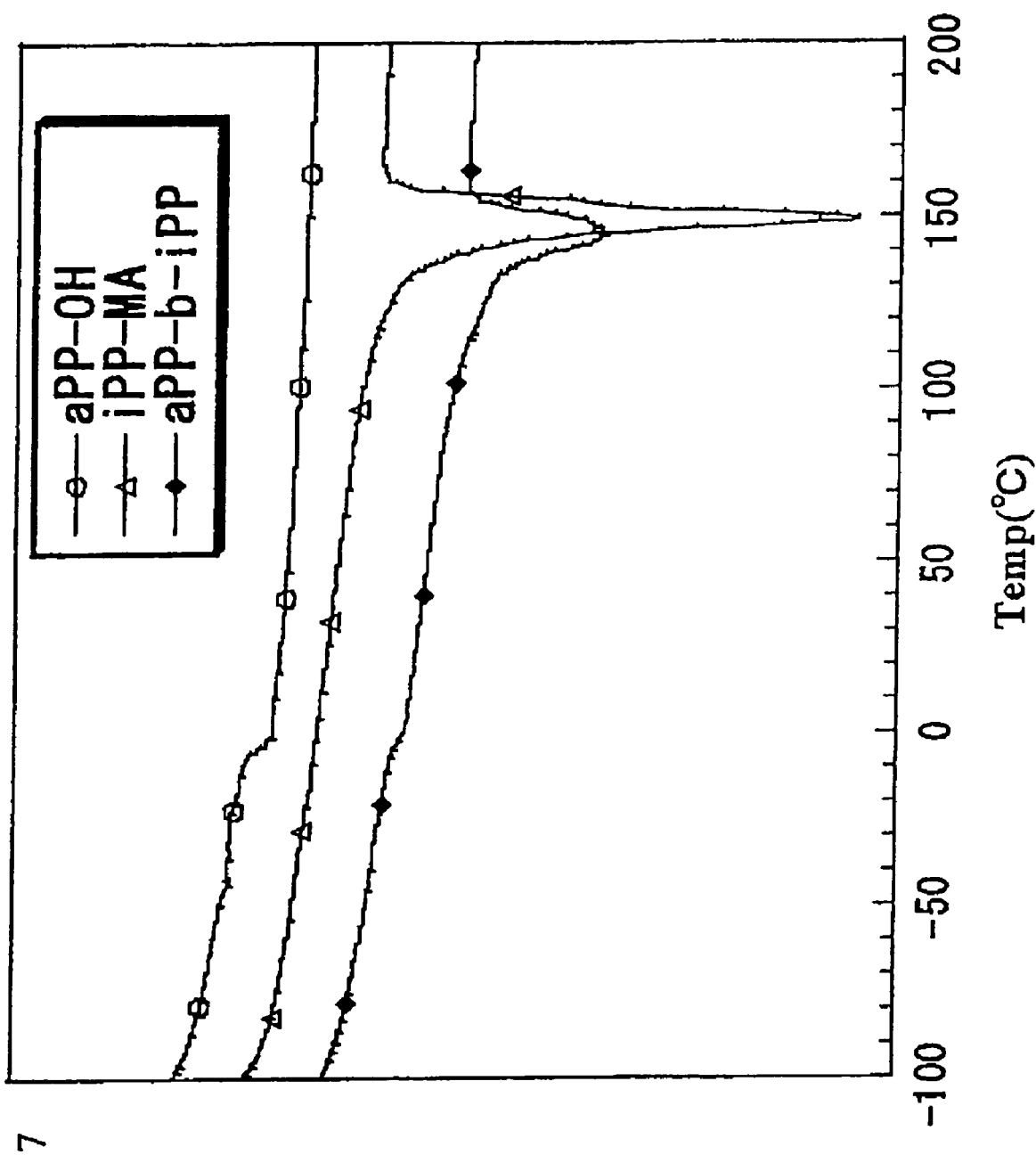
FIG. 7 is a diagram which shows the DSC curves of aPP-OH, iPP-MA and aPP-b-iPP.

Into an eggplant type flask, 0.31 g of aPP-OH, 0.23 g of iPP-MA and 0.0060 g of p-toluenesulfonic acid as catalyst were introduced and a two-way stopcock was mounted. Then, the inside of the flask was evacuated to 1-2 mmHg and a reaction was carried out in a molten state at 190° C. for 24 hours. After the completion of the reaction, the flask was returned to room temperature and 0.52 g of copolymer aPP-b-iPP was recovered. The GPC curves of the raw material and the copolymer are shown in FIG. 6. The DSC curves of the raw material and the copolymer are shown in FIG. 7. The molecular weights, polydispersities, melting points and melting enthalpies of the raw material and the copolymer are shown in Table 2.

TABLE 2

|  | Mn × $10^{-3}$ | Mw/Mn | Tm (° C.) | _H (J/g) |
|---|---|---|---|---|
| aPP-OH | 4.39 | 2.63 | — | — |
| iPP-MA | 3.11 | 2.65 | 144.6 | 154.9 |
| aPP-b-iPP | 15.1 | 7.44 | 149.3 | 65.0 |

Example 3

Synthesis of Polypropylene/Polypropylene Block Copolymer (iPP-b-sPP)

Figure 8:
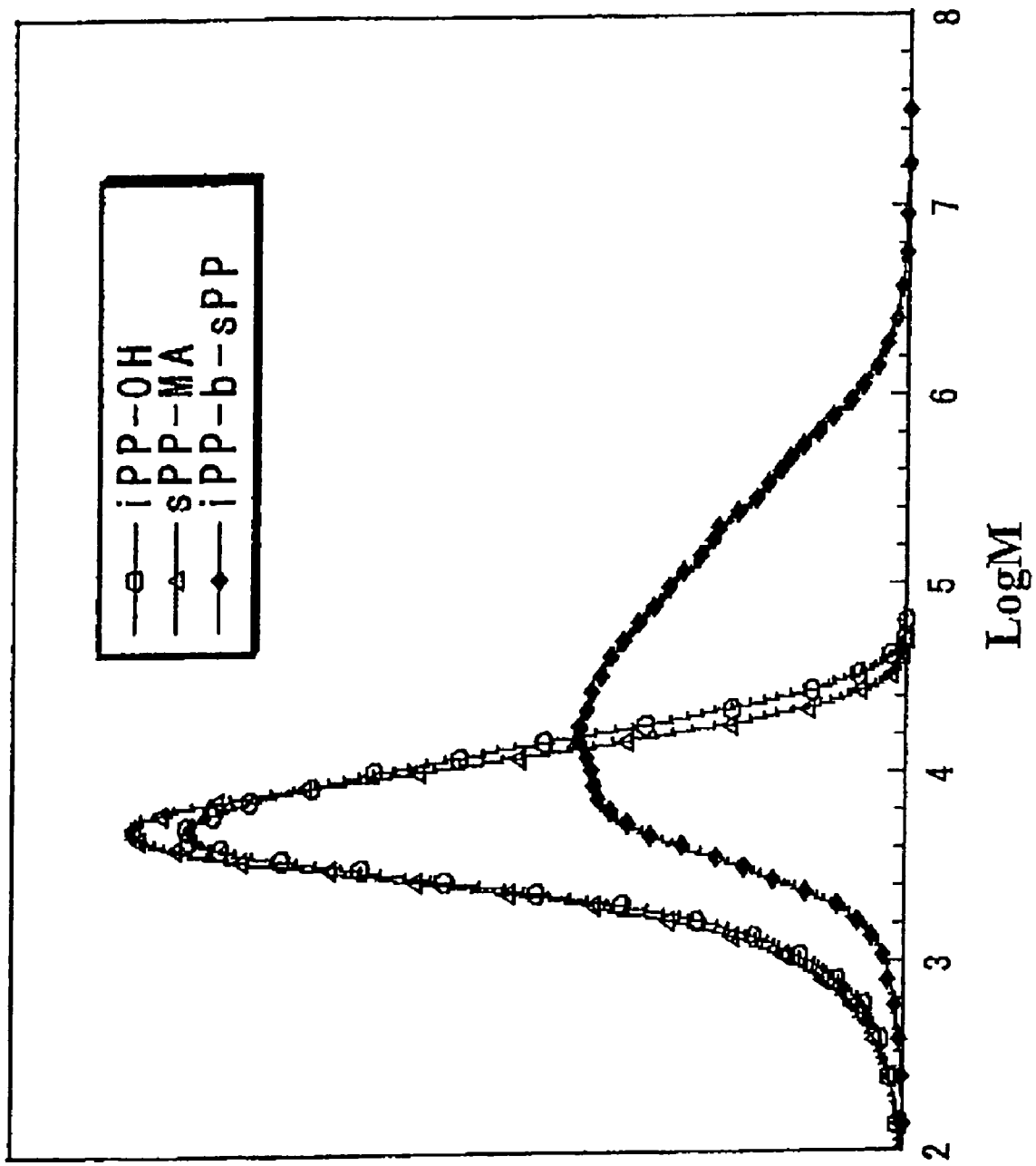
FIG. 8 is a diagram which shows the GPC curves of iPP-OH, SPP-MA and iPP-b-sPP.
Figure 9:
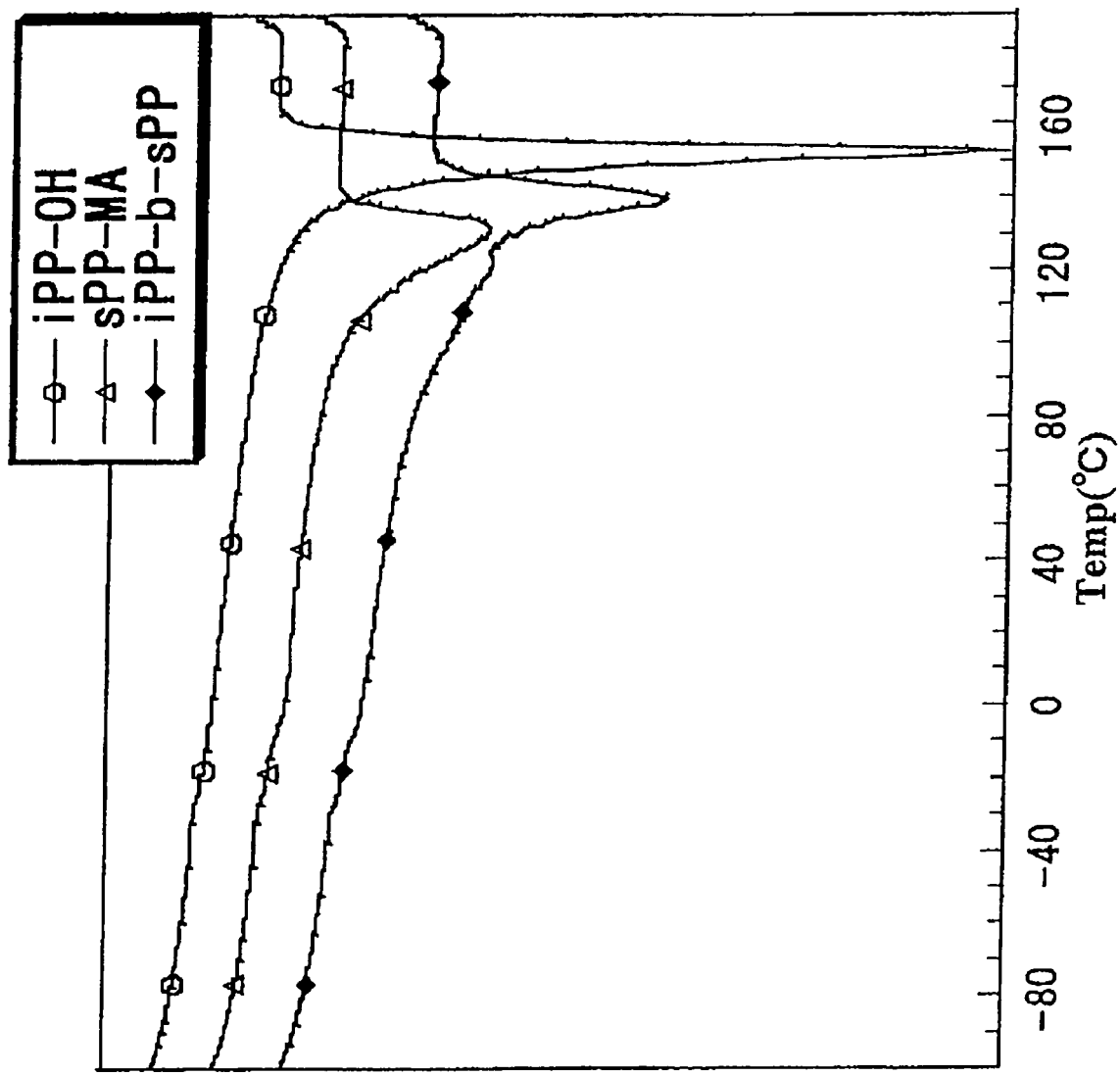
FIG. 9 is a diagram which shows the DSC curves of iPP-OH, SPP-MA and iPP-b-sPP.

Into an eggplant type flask, 0.25 g of iPP-OH, 0.26 g of sPP-MA and 0.011 g of p-toluenesulfonic acid as catalyst were introduced and a two-way stopcock was mounted. Then, the inside of the flask was evacuated to 1-2 mmHg and a reaction was carried out in a molten state at 190° C. for 24 hours. After the completion of the reaction, the flask was returned to room temperature and 0.48 g of copolymer iPP-b-sPP was recovered. The GPC curves of the raw material and the copolymer are shown in FIG. 8. The DSC curves of the raw material and the copolymer are shown in FIG. 9. The molecular weights, polydispersities, melting points and melting enthalpies of the raw material and the copolymer are shown in Table 3.

TABLE 3

|  | Mn × $10^{-3}$ | Mw/Mn | Tm (° C.) | _H (J/g) |
|---|---|---|---|---|
| iPP-OH | 3.04 | 2.38 | 152.6 | 110.2 |
| sPP-MA | 2.89 | 2.16 | 131.0 | 50.5 |
| iPP-b-sPP | 9.64 | 15.7 | 139.1 | 55.2 |

Example 4

Synthesis of Polypropylene/Polypropylene Block Copolymer (iPP-b-sPP)

Figure 10:
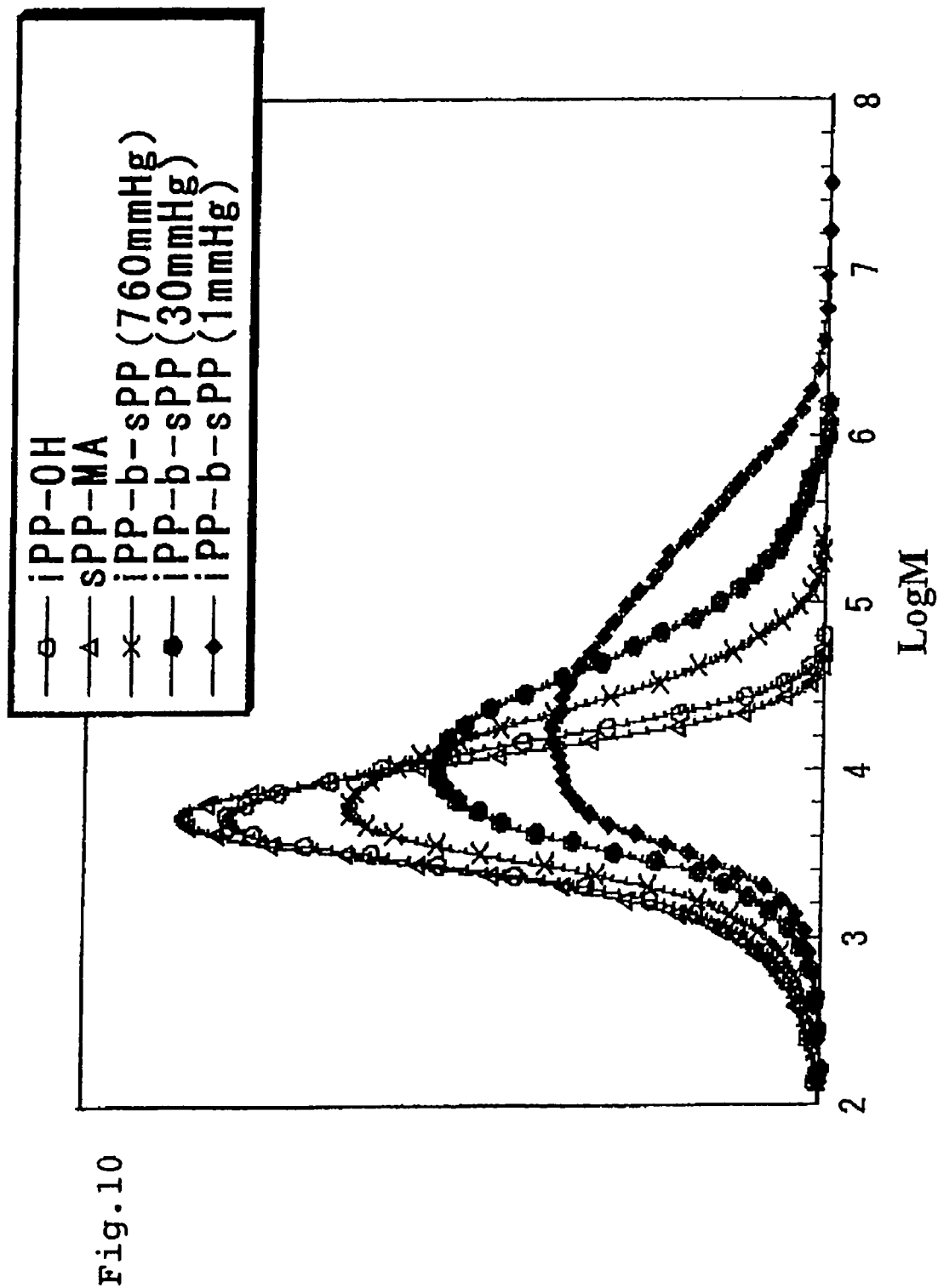
FIG. 10 is a diagram which shows the pressure dependency of the GPC curve of iPP-b-sPP.

Into an eggplant type flask, 0.22 g of IPP-OH, 0.23 g of sPP-MA and 0.0093 g of p-toluenesulfonic acid as catalyst were introduced and a two-way stopcock was mounted. Then, the inside of the flask was evacuated to 30 mmHg and a reaction was carried out in a molten state at 190° C. for 24 hours. After the completion of the reaction, the flask was returned to room temperature and 0.44 g of copolymer iPP-b-sPP was recovered. The GPC curve of the resulting copolymer is shown in FIG. 10.

Example 5

Synthesis of Polypropylene/Polypropylene Block Copolymer (iPP-b-sPP)

Into an eggplant type flask, 0.21 g of iPP-OH, 0.22 g of sPP-MA and 0.0088 g of p-toluenesulfonic acid as catalyst were introduced and a two-way stopcock was mounted. Subsequently, a reaction was carried out in a molten state under normal pressure at 190° C. for 24 hours. After the completion of the reaction, the flask was returned to room temperature and 0.42 g of copolymer iPP-b-sPP was recovered. The GPC curve of the resulting copolymer is shown in FIG. 10.

Example 6

Synthesis of Polypropylene/Polypropylene Block Copolymer (iPP-b-iPP)

Figure 11:
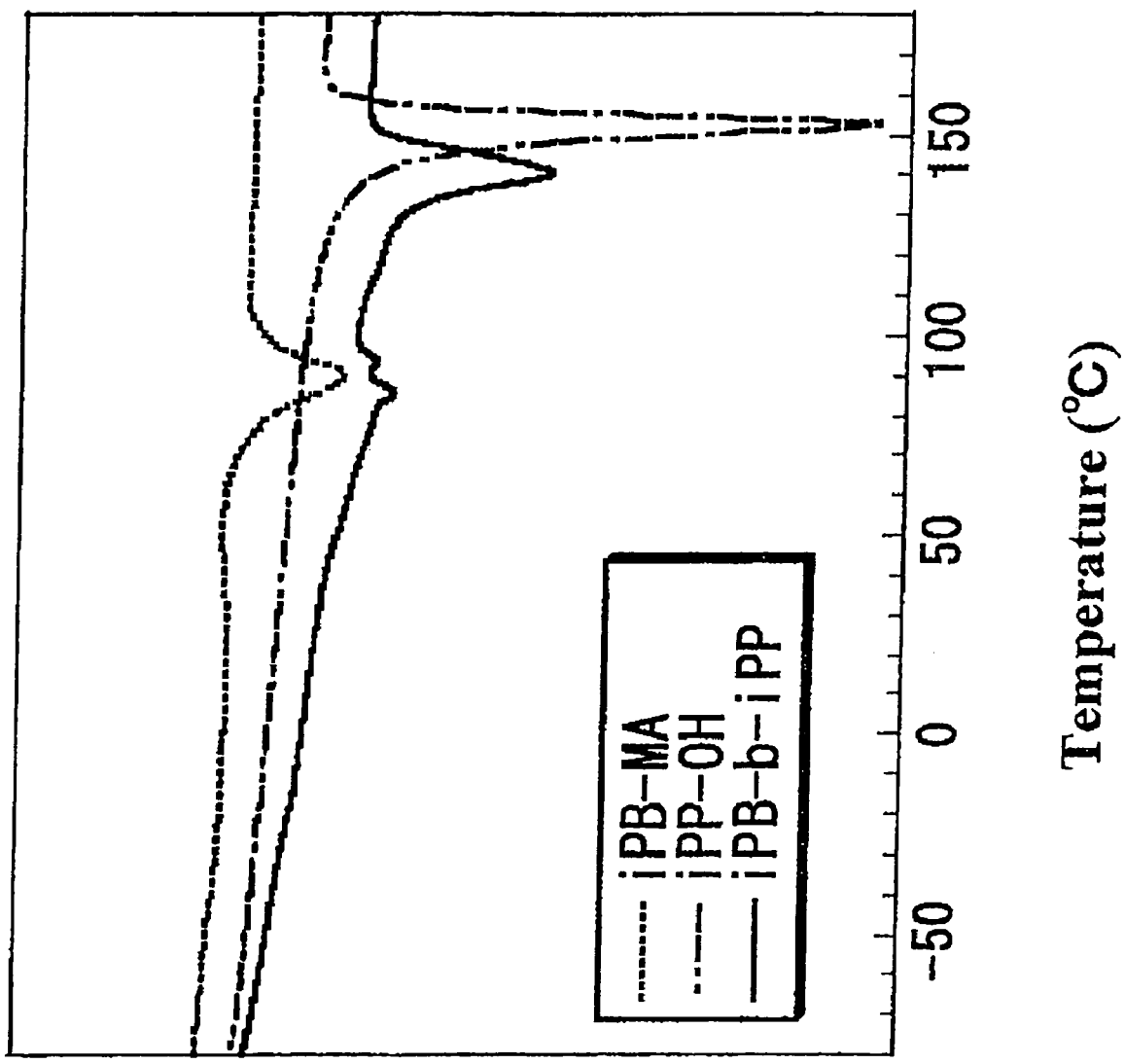
FIG. 11 is a diagram which shows the DSC curves of iPB-MA, iPP-OH and iPB-b-iPP.
Figure 12:
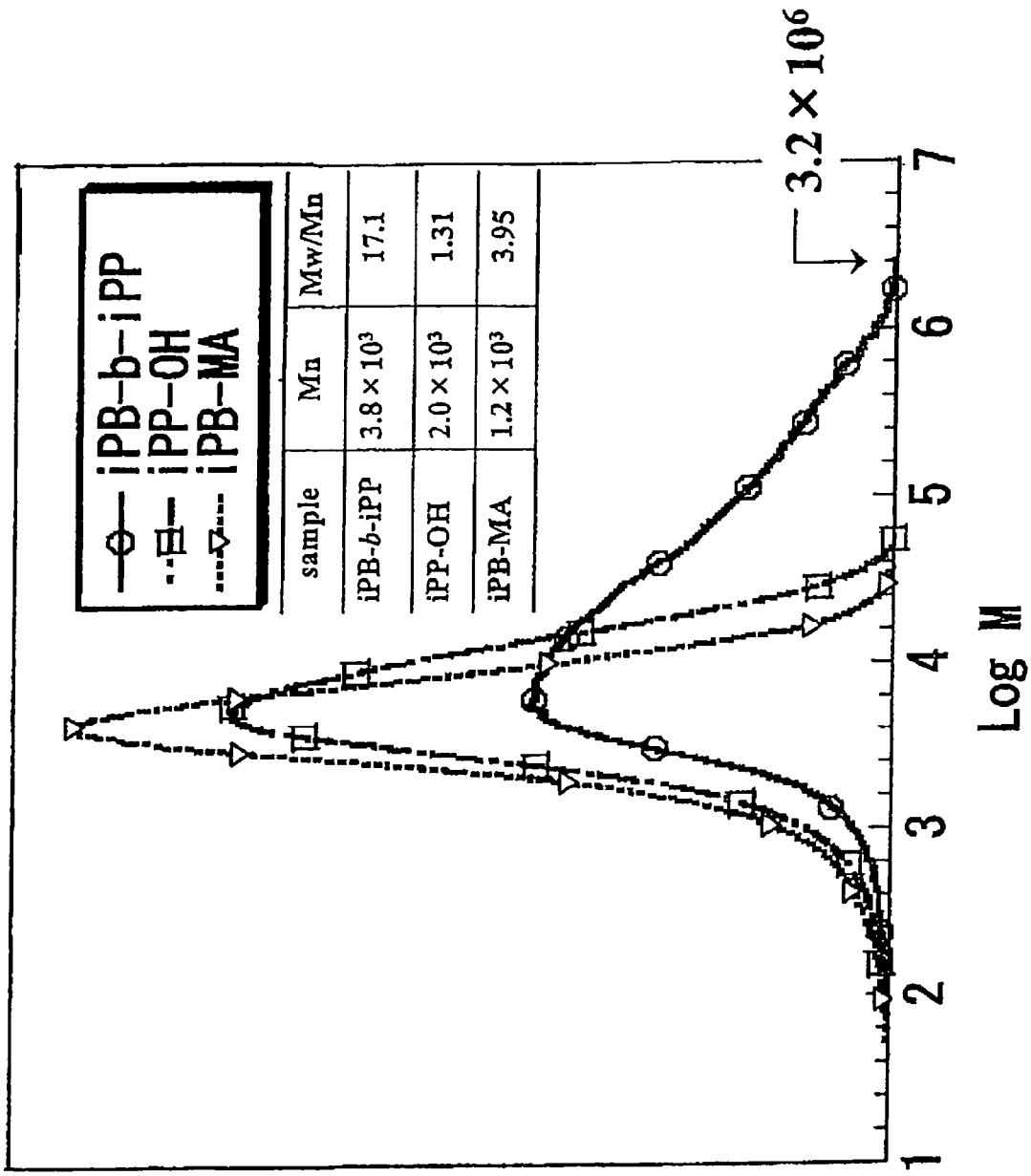
FIG. 12 is a diagram which shows the GPC curve, the molecular weight and the polydispersity of iPB-b-iPP, iPP-OH and iPB-MA.
Figure 13:
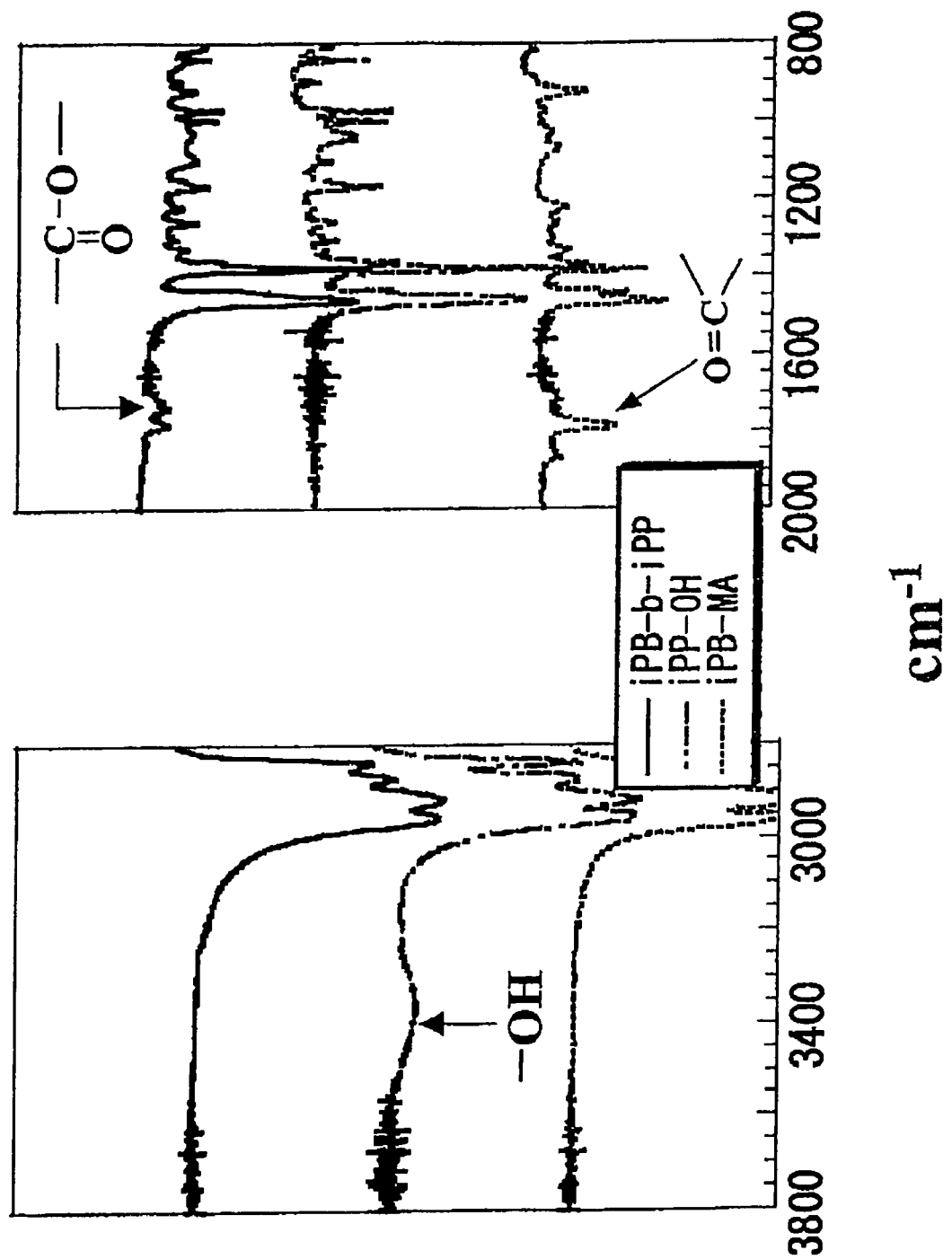
FIG. 13 is a diagram showing the FT-IR data of iPP-b-iPP, iPP-OH and iPB-MA.

Into an eggplant type flask, 0.23 g of iPP-OH, 0.24 g of iPP-MA and 0.0093 g of p-toluenesulfonic acid as catalyst were introduced and a two-way stopcock was mounted. Then, the inside of the flask was evacuated to 1-2 mmHg and a reaction was carried out in a molten state at 190° C. for 24 hours. After the completion of the reaction, the flask was returned to room temperature and 0.40 g of copolymer iPB-b-iPP was recovered. The melting enthalpies and melting points of the raw material and the copolymer are shown in Table 4. The DSC curves of the raw material and the copolymer are shown in FIG. 11. The GPC curves, molecular weights and polydispersities of the raw material and the copolymer are shown in FIG. 12. FT-IR data of the raw material and the copolymer are shown in FIG. 13.

TABLE 4

| sample | Melting enthalpy (mJ/mg) | Tm (° C.) |
|---|---|---|
| iBP-b-iPP | 91.4 | 140.1 |
| iPP-OH | 173.5 | 152.5 |
| iPB-MA | 53.9 | 89.4 |

Example 7

Synthesis of Polystyrene/Polyethylene Block Copolymer (SPP-b-PE) (Solution System)

Figure 14:
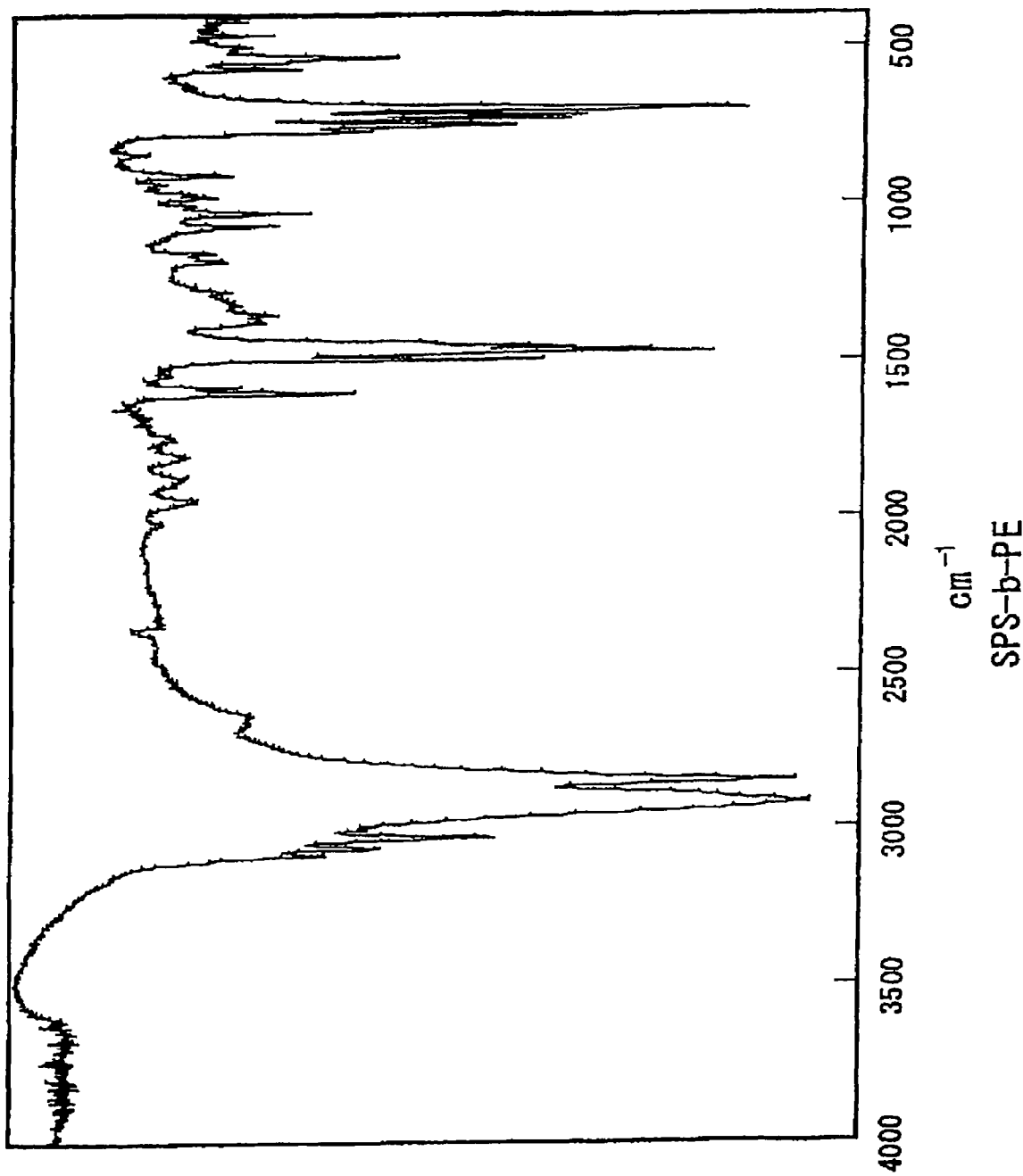
FIG. 14 is a diagram which shows the IR data of SPS-b-PE.
Figure 15:
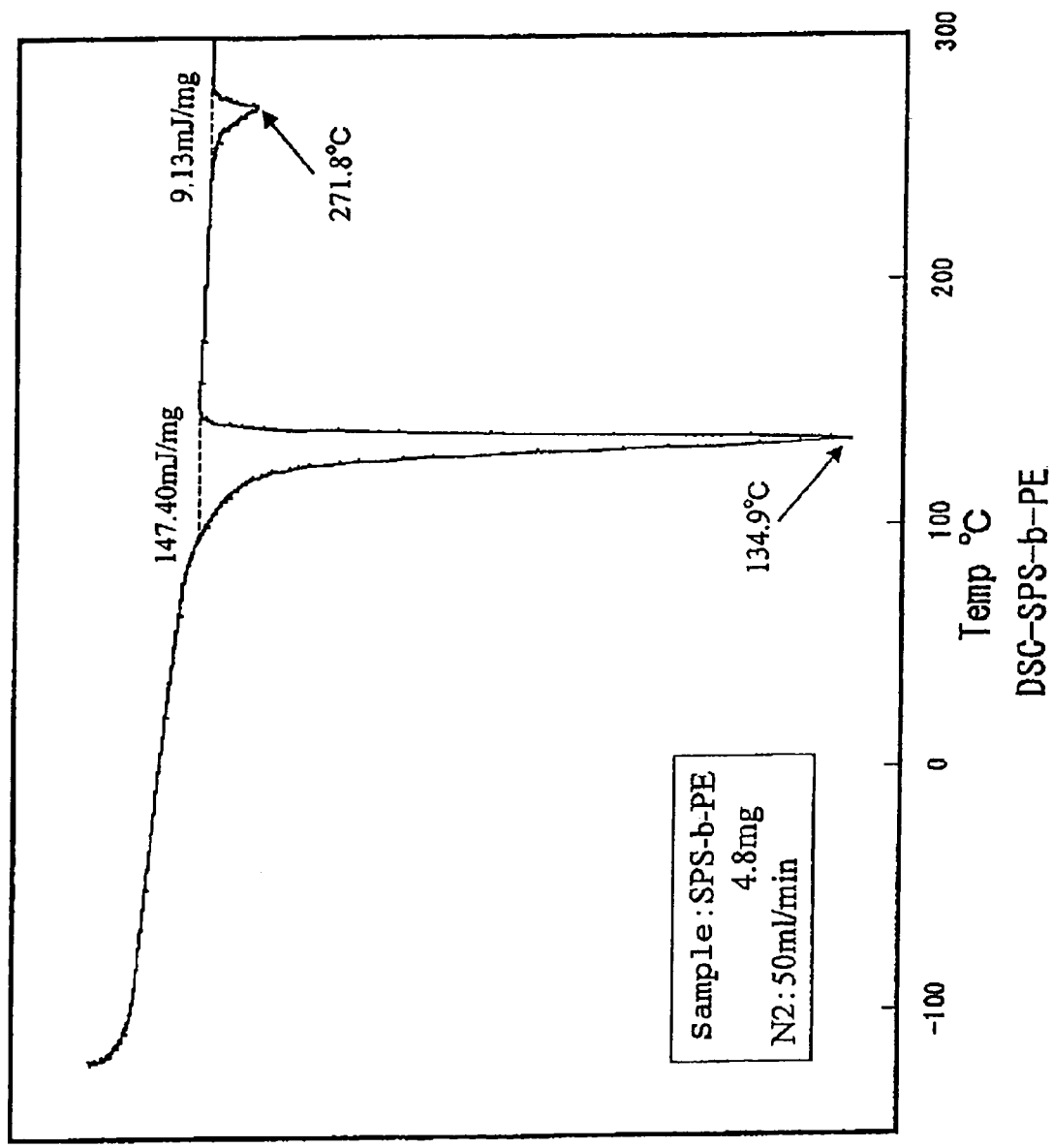
FIG. 15 is a diagram which shows the DSC curve of SPS-b-PE.
Figure 16:
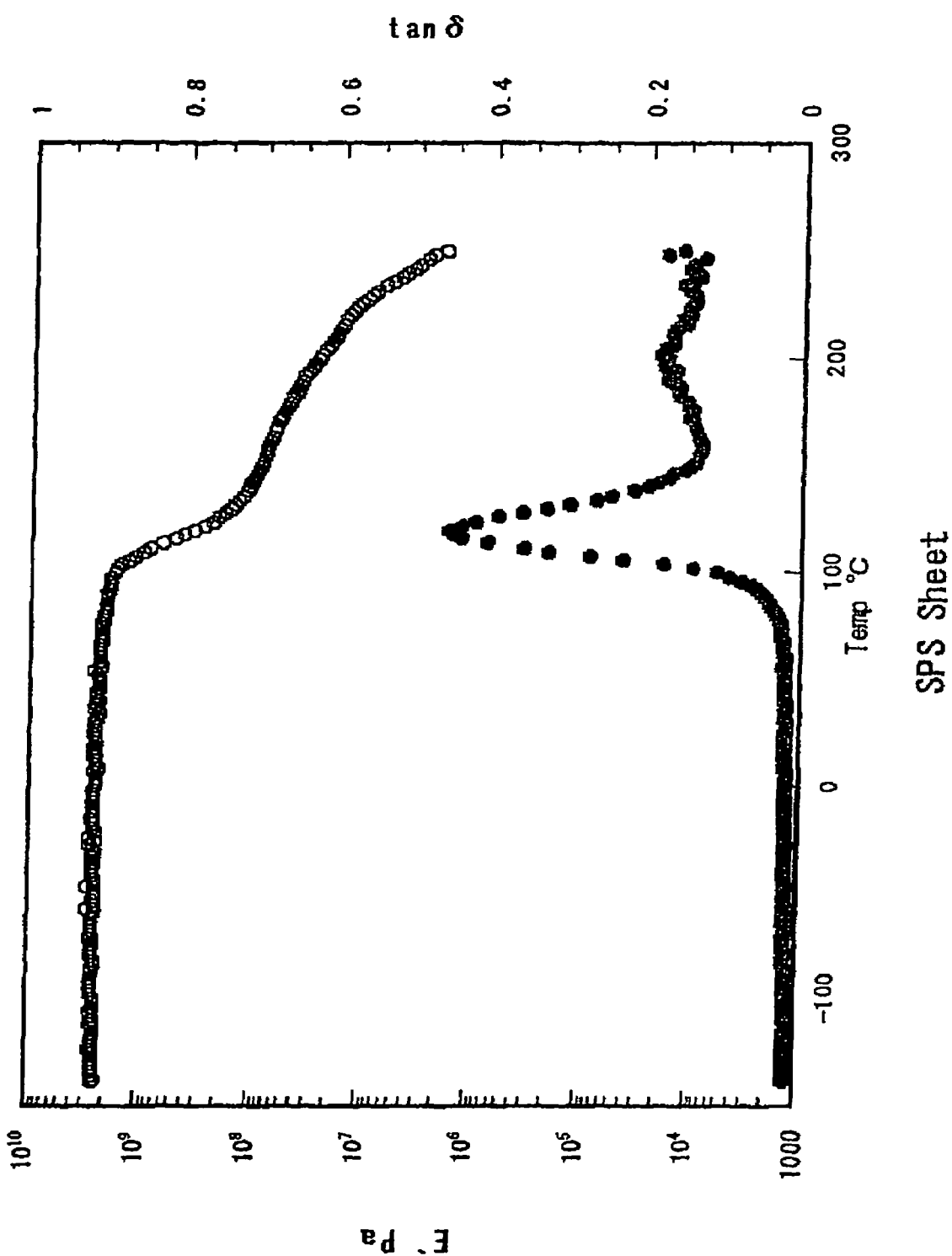
FIG. 16 is a diagram which shows the DMA curve of SPS sheet.
Figure 17:
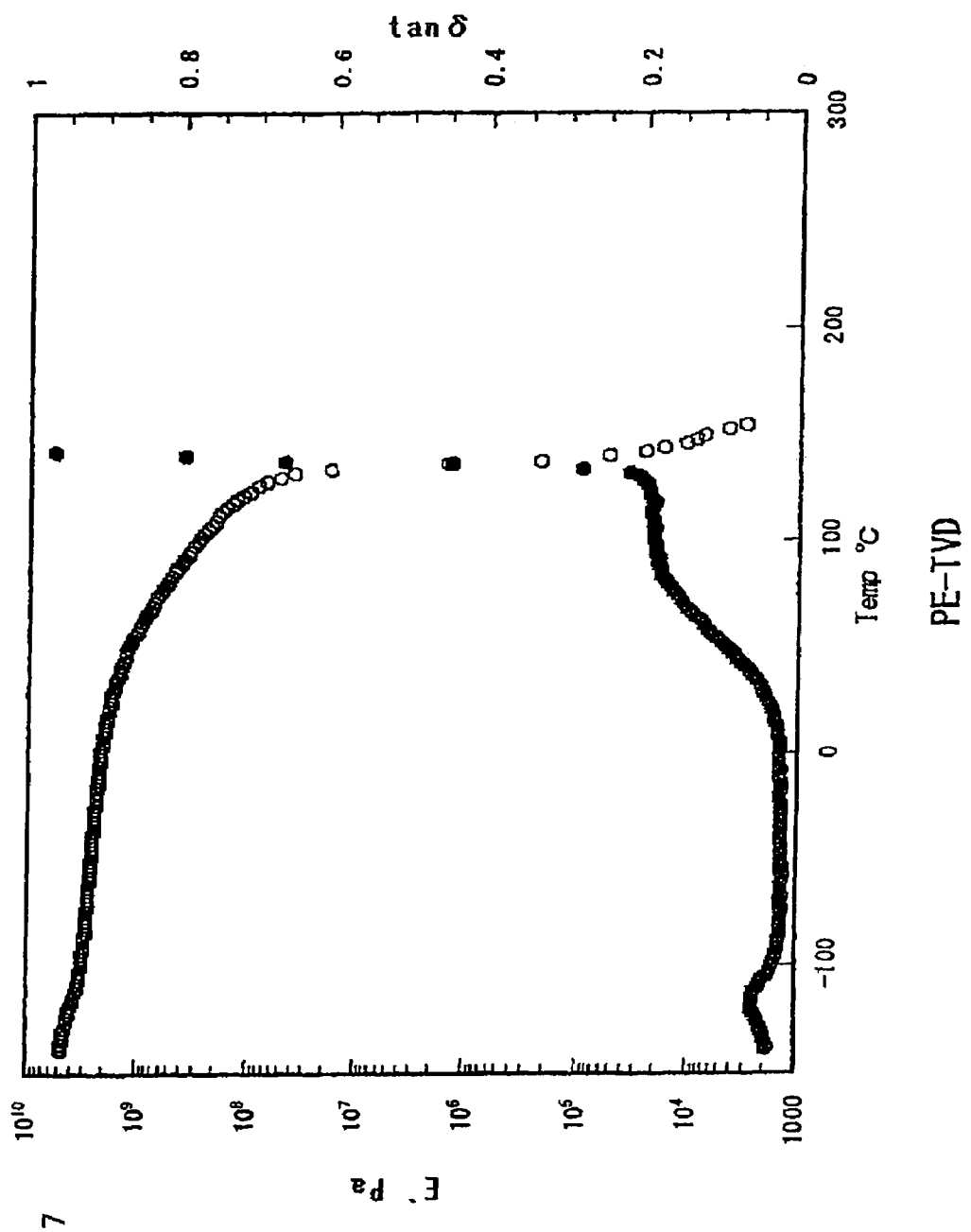
FIG. 17 is a diagram which shows the DMA curve of PE-TVD.
Figure 18:
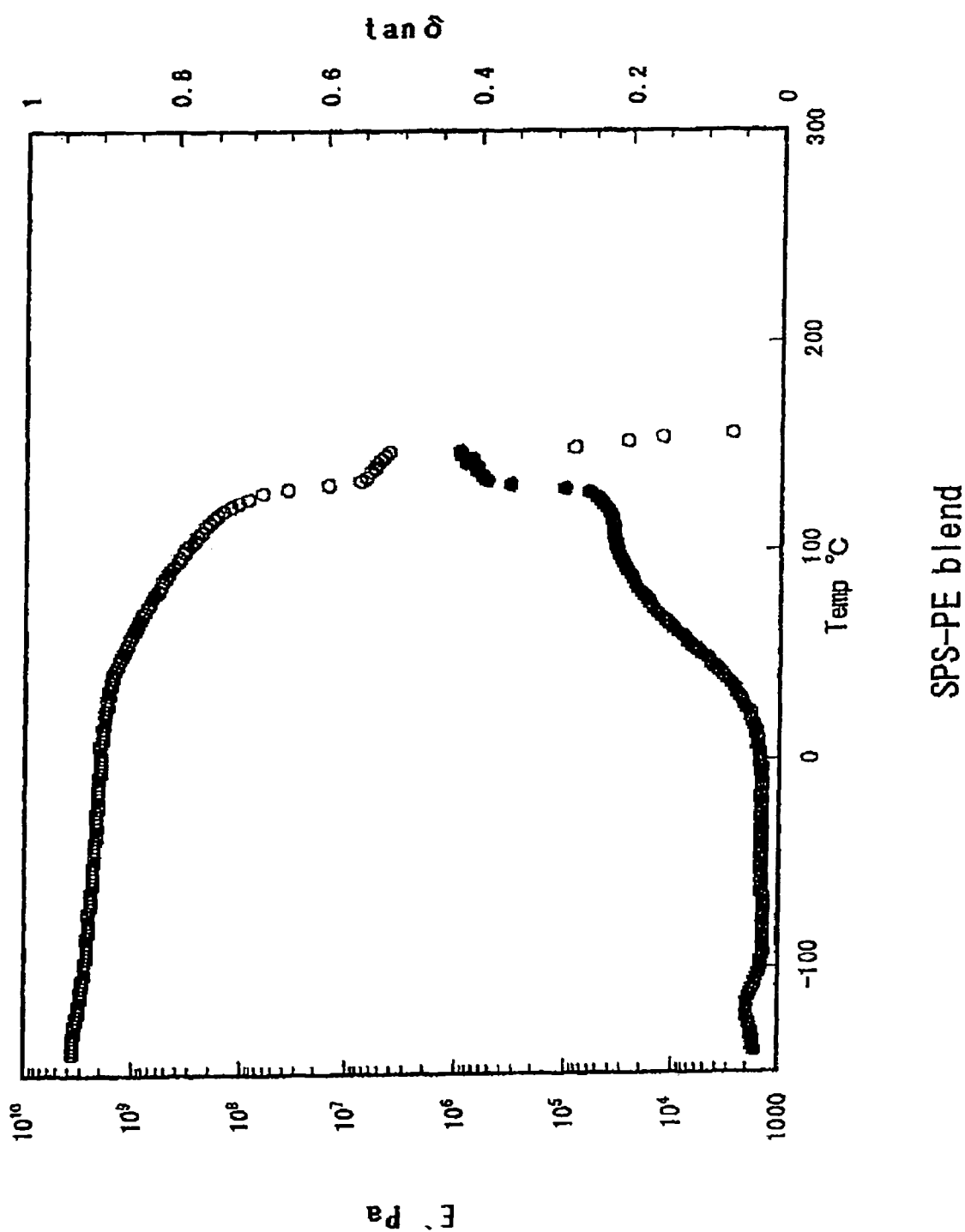
FIG. 18 is a diagram which shows the DMA curve of a blend of SPS and PE.
Figure 19:
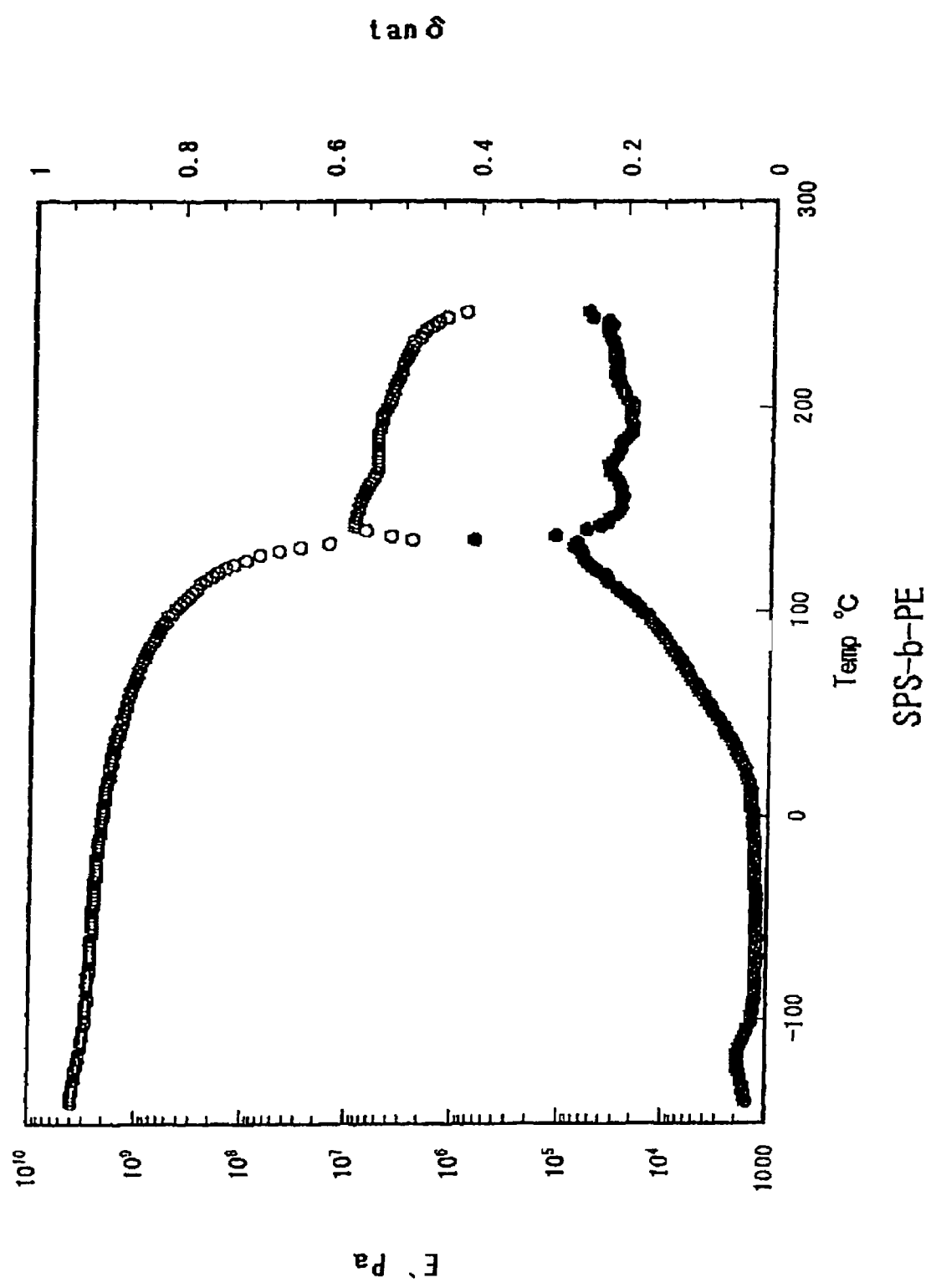
FIG. 19 is a diagram which shows DMA curve of SPS-b-PE.

A reaction device capable of removing moisture formed as a by-product of a reaction was employed. Into a flask, 120 ml of distilled toluene, 2.0 g or PE-OH, 1.0 g of SPS-MA and 0.01 g of p-toluenesulfonic acid as catalyst were introduced and a reaction was conducted under reflux at 140° C. for 24 hours. After the reaction, hot filtration was conducted using methanol as precipitation solvent. The resulting precipitation was collected by suction filtration and dried under reduced pressure to yield SPS-b-PE. The IR data of SPS-b-PE are shown in FIG. 14 and the DSC curve thereof is shown in FIG. 15.

Example 8

Synthesis of Polystyrene/Polyethylene Block Copolymer (SPP-b-PE) (Melting System)

Into a flask, 0.6 g of PE-OH, 0.3 g of SPS-MA and 0.01 g of Amberlyst (manufactured by Aldlich Chemical Co., Inc.) were introduced. After nitrogen purge, a reaction was conducted under reduced pressure of up to 10 mmHg at 300° C. for 24 hours. After the reaction, the product was dissolved in xylene and hot filtration was conducted using methanol as precipitation solvent. The resulting precipitation was collected by suction filtration and dried under reduced pressure to yield SPS-b-PE.

Referential Example 1

Measurement of Viscoelasticity (DMA)

The viscoelastic behavior of SPS sheet, PE-TVD, a blend of SPS-PE and SPS-b-PE was evaluated in a tension mode at a frequency of 10 Hz and a heating rate of 5° C./min. The results are shown in FIG. 16 to FIG. 19. As is understood from the comparison of FIG. 18 and FIG. 19, in the DMA of the polystyrene/polyethylene block copolymer, a high temperature region appears which is not found in the DMA of the blend.

INDUSTRIAL APPLICABILITY

The polyolefin/polyolefin block copolymer has a molecular weight higher than ever before. Especially, a block copolymer prepared under reduced pressure in the absence of solvent has a ultra high molecular weight. As a result, entanglement of molecular chains occurs sufficiently and it can be molded into a film.

The polystyrene/polyethylene block copolymer of the present invention has a novel characteristic that a rubbery state is maintained even at high temperature because there is microphase separation in the copolymer. Such a characteristic is not expected from the characteristics of polystyrene or polyethylene which are raw materials of the block copolymer.

According to the production process of the present invention, a novel polyesterified block copolymer is obtained through an esterification reaction between a terminallymaleic acid-modified polymer and a terminally hydroxylated polymer. It is possible to obtain macromolecular compounds having a novel functionality such as polyolefin/polyolefin block copolymers and polystyrene/polyethylene block copolymers by properly selecting starting materials.

The invention claimed is:

1. A polyolefin/polyolefin block copolymer represented by the following general formula (1):

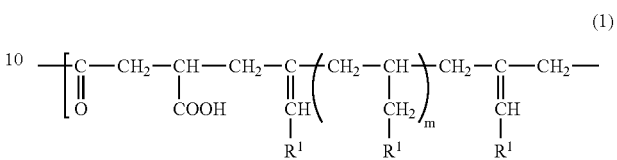

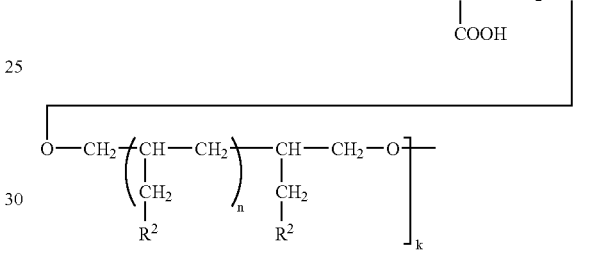

wherein $R^1$ and $R^2$ each independently represent a hydrogen atom or a methyl group, m represents an integer of from 10 to 200, n represents an integer of from 10 to 200, and k represents an integer of from 5 to 3000.

2. A process for producing a polyolefin/polyolefin block copolymer, the process comprising hydroxylating a polyolefin selected from the group consisting of atactic telechelic polypropylene, isotactic telechelic polypropylene, syndiotactic telechelic polypropylene and isotactic telechelic poly-1-butene at its both terminals, separately modifying a polyolefin the same as or different from the polyolefin selected above at its both terminals with maleic anhydride, and obtaining a block copolymer through an esterification reaction between the hydroxylated polyolefin and the maleic anhydride-modified polyolefin.

3. The process for producing a polyolefin/polyolefin block copolymer according to claim 2, wherein the esterification reaction is conducted under reduced pressure in the absence of solvent.

4. A polystyrene/polyethylene block copolymer represented by the following general formula (2) or general formula (3):

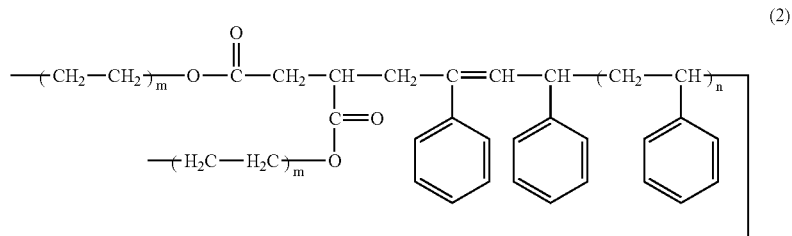
(2)
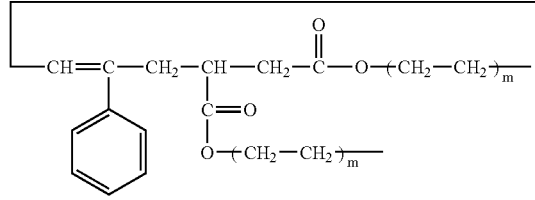
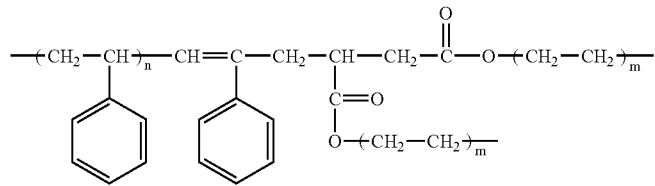
(3)
wherein m represents an integer of from 500 to 50000 and n represents an integer of from 50 to 5000.
5. A process for producing a polystyrene/polyethylene block copolymer wherein the polystyrene/polyethylene block copolymer is obtained through an esterification reaction between a maleic anhydride-modified polystyrene and a hydroxylated polyethylene.
* * * * *